United States Patent
Ng et al.

(10) Patent No.: US 9,121,924 B2
(45) Date of Patent: Sep. 1, 2015

(54) METHOD FOR DETERMINATION OF WIRELESS TERMINALS POSITIONS AND ASSOCIATED SYSTEM AND APPARATUS THEREOF

(75) Inventors: Chan Wah Ng, Singapore (SG); Kian Soon Cheng, Singapore (SG); Pek Yew Tan, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 166 days.

(21) Appl. No.: 13/995,295

(22) PCT Filed: Dec. 6, 2011

(86) PCT No.: PCT/JP2011/006808
§ 371 (c)(1),
(2), (4) Date: Jun. 18, 2013

(87) PCT Pub. No.: WO2012/095922
PCT Pub. Date: Jul. 19, 2012

(65) Prior Publication Data
US 2013/0273938 A1 Oct. 17, 2013

(30) Foreign Application Priority Data

Jan. 13, 2011 (JP) .................................. 2011-004669
Apr. 25, 2011 (JP) .................................. 2011-096935

(51) Int. Cl.
*H04W 24/00* (2009.01)
*G01S 5/06* (2006.01)
(Continued)

(52) U.S. Cl.
CPC .................. *G01S 5/06* (2013.01); *H04W 64/00* (2013.01); *H04W 84/12* (2013.01); *H04W 84/18* (2013.01)

(58) Field of Classification Search
CPC ....... H04W 64/00; H04W 4/02; H04W 16/18; H04W 4/028; H04W 64/003; H04W 16/20; G01S 5/0252; G01S 5/02; G01S 5/14; G01S 1/026; G01S 2205/008; G01S 5/0009; G01S 5/0018; G01S 5/0054; G01S 5/0205; G01S 5/06; G01S 1/045; G01S 5/0278; G01S 5/0242; G01S 5/0263; G01C 21/206
USPC .............................................. 455/456.1–457
See application file for complete search history.

(56) References Cited

U.S. PATENT DOCUMENTS 7,403,784 B2  7/2008  Ju et al.
7,412,248 B2  8/2008  McNew et al.
(Continued)

FOREIGN PATENT DOCUMENTS

EP    1161107 A1    12/2001
JP    2007-64978 A   3/2007
(Continued)

OTHER PUBLICATIONS

International Search Report for PCT/JP2011/006808 dated May 7, 2012.
(Continued)

*Primary Examiner* — Allahyar Kasraian
(74) *Attorney, Agent, or Firm* — Pearne & Gordon LLP

(57) ABSTRACT

Conventional position estimation methods require the deployment of more fixed anchors in order to increase the accuracy in a crowded indoor environment, or they suffer from inaccuracies due to multipath fading. The present invention overcomes the problems associated with the prior arts by selecting one or more mobile nodes as virtual anchors when estimating the position of a target mobile node. This takes advantage of the fact that mobile nodes are closer to the target mobile node than the access points in most typical deployments, thus eliminating the need to deploy more access points or fixed anchors for the purpose of position determination. After obtaining an initial estimate of the position of the target mobile node, the target mobile node can serve as virtual anchors to estimate the positions of other mobile nodes, which can then be used to further refine the position estimate of the target mobile node.

15 Claims, 20 Drawing Sheets

(51) Int. Cl.
*H04W 64/00* (2009.01)
*H04W 84/12* (2009.01)
*H04W 84/18* (2009.01)

(56) References Cited

U.S. PATENT DOCUMENTS

| | | | |
|---|---|---|---|
| 7,570,927 | B2 | 8/2009 | Correal et al. |
| 7,660,591 | B1 | 2/2010 | Krishnakumar et al. |
| 7,751,827 | B2 | 7/2010 | Poykko et al. |
| 7,821,453 | B2 | 10/2010 | Wu et al. |
| 2004/0203872 | A1* | 10/2004 | Bajikar ............... 455/456.1 |
| 2007/0004428 | A1 | 1/2007 | Morgan et al. |
| 2007/0049291 | A1 | 3/2007 | Kim et al. |
| 2007/0178922 | A1 | 8/2007 | Yamada et al. |
| 2008/0032705 | A1* | 2/2008 | Patel et al. ............ 455/456.1 |
| 2009/0046013 | A1 | 2/2009 | Yanagihara |
| 2009/0153402 | A1 | 6/2009 | Doh et al. |
| 2010/0105409 | A1 | 4/2010 | Agarwal et al. |
| 2011/0159862 | A1* | 6/2011 | Jackson .................. 455/418 |

FOREIGN PATENT DOCUMENTS

| | | |
|---|---|---|
| JP | 2007-329887 A | 12/2007 |
| JP | 2009-47487 A | 3/2009 |
| JP | 2010-507985 A | 3/2010 |
| WO | 01/50794 A1 | 7/2001 |
| WO | 2007/021071 A1 | 2/2007 |
| WO | 2008/115209 A2 | 9/2008 |

OTHER PUBLICATIONS

Pengxi Liu et al.: "A Novel Virtual Anchor Node-Based Localization Algorithm for Wireless Sensor Networks", Networking, 2007. ICN '07. Sixth International Conference on, IEEE, PI, Apr. 22, 2007.

Langendoen K et al: "Distributed localization in wireless sensor networks: a quantitative comparison", Computer Networks, Elsevier Science Publishers B.V., Amsterdam, NL, vol. 43, No. 4, Nov. 15, 2003.

Niculescu D: "Positioning in Ad Hoc Sensor Networks", IEEE Network, IEEE Service Center, New York, NY, US, vol. 18, No. 4, Jul. 1, 2004.

Florian Huc et al: "Virtual Raw Anchor Coordinates: A New Localization Paradigm", Jul. 5, 2010, Algorithms for Sensor Systems, Springer Berlin Heidelberg, Berlin.

* cited by examiner

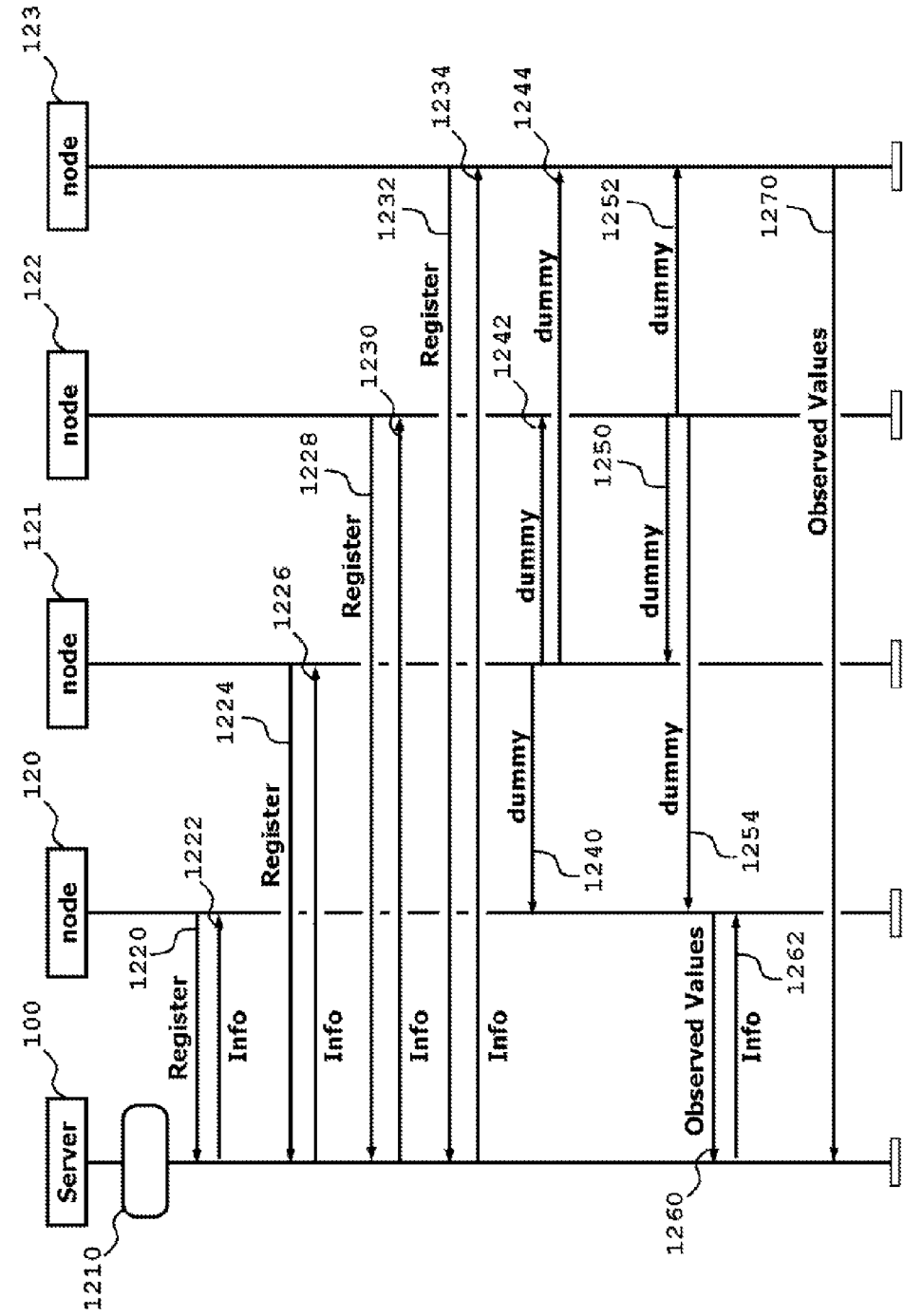

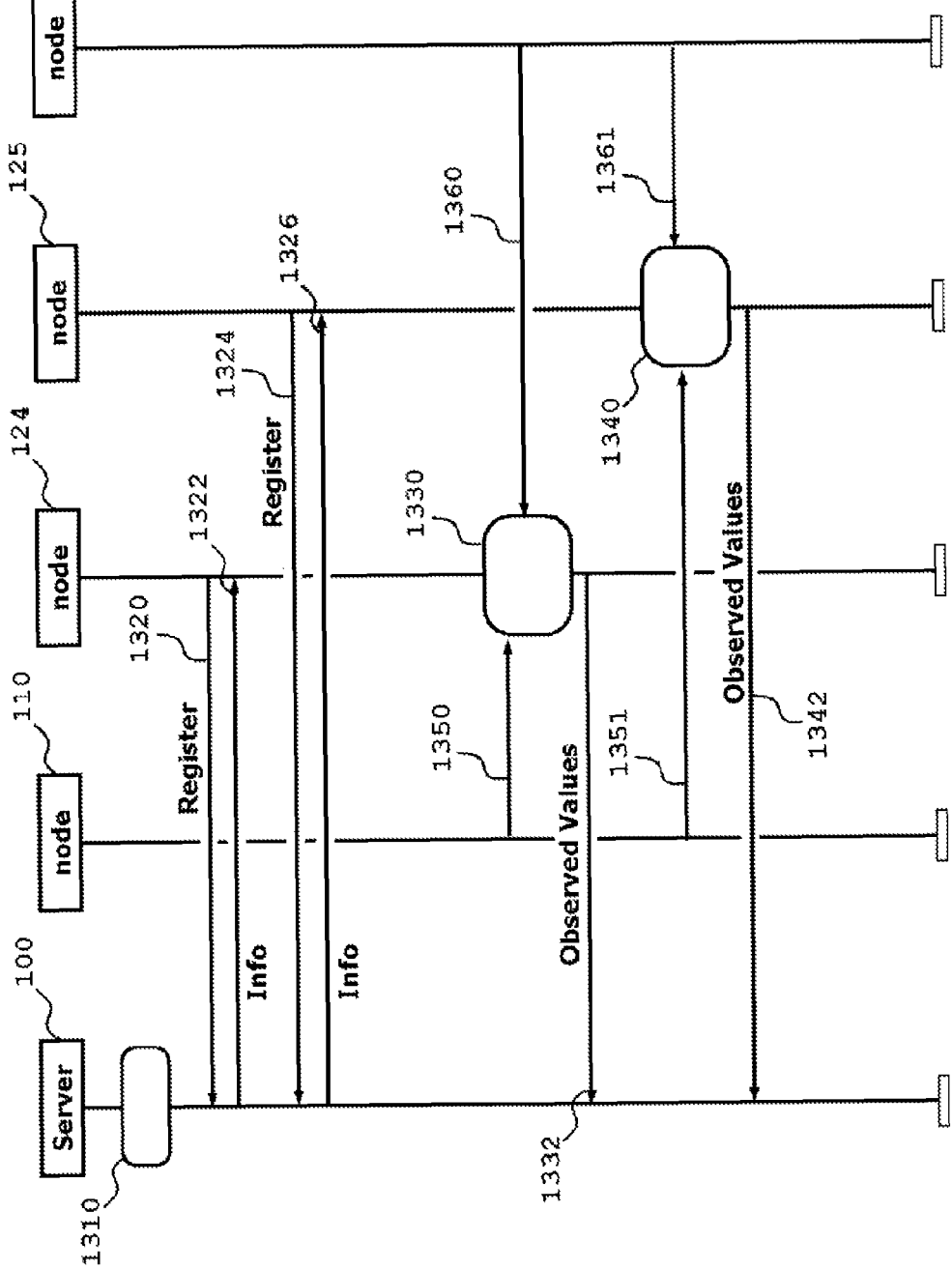

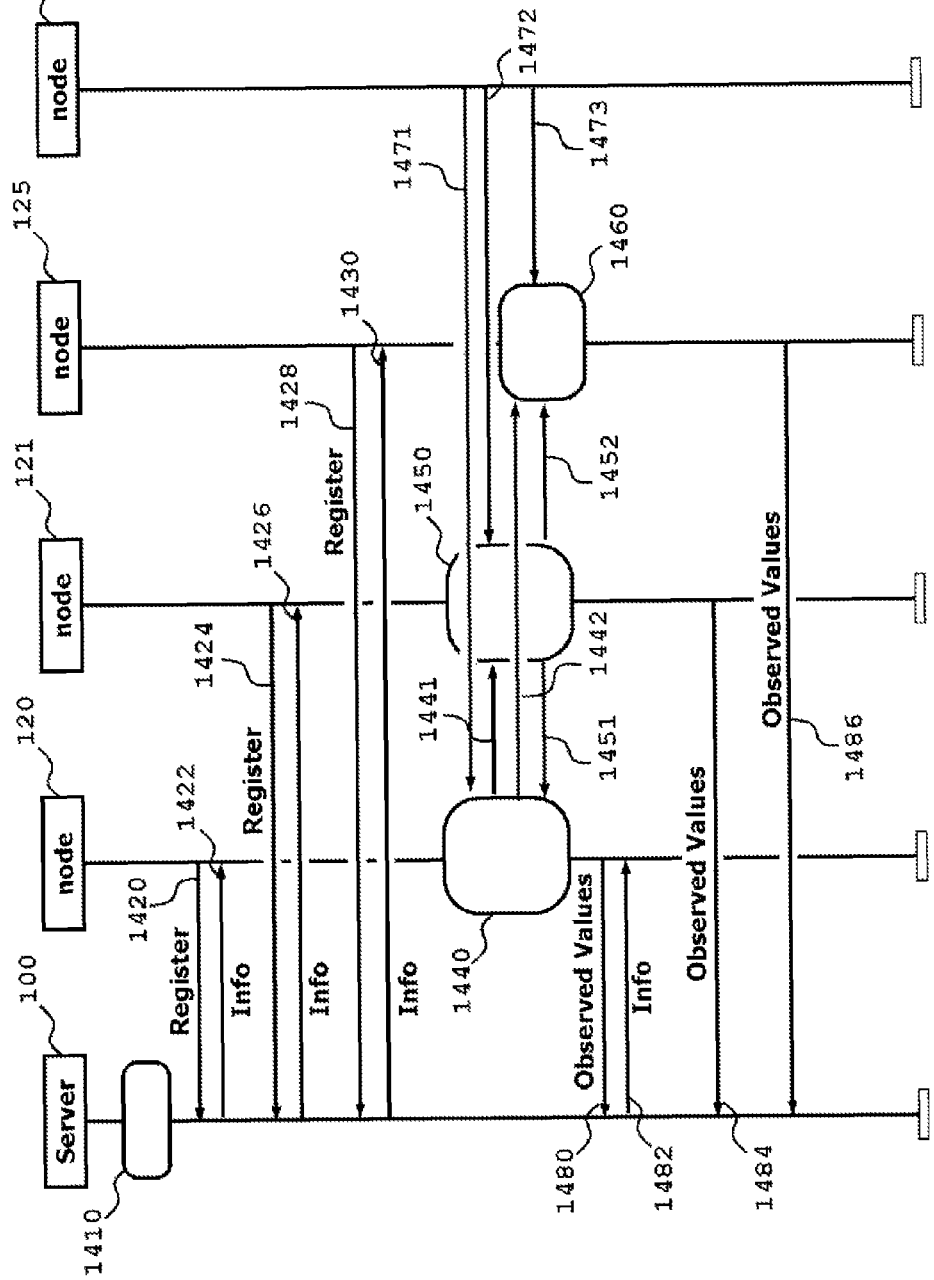

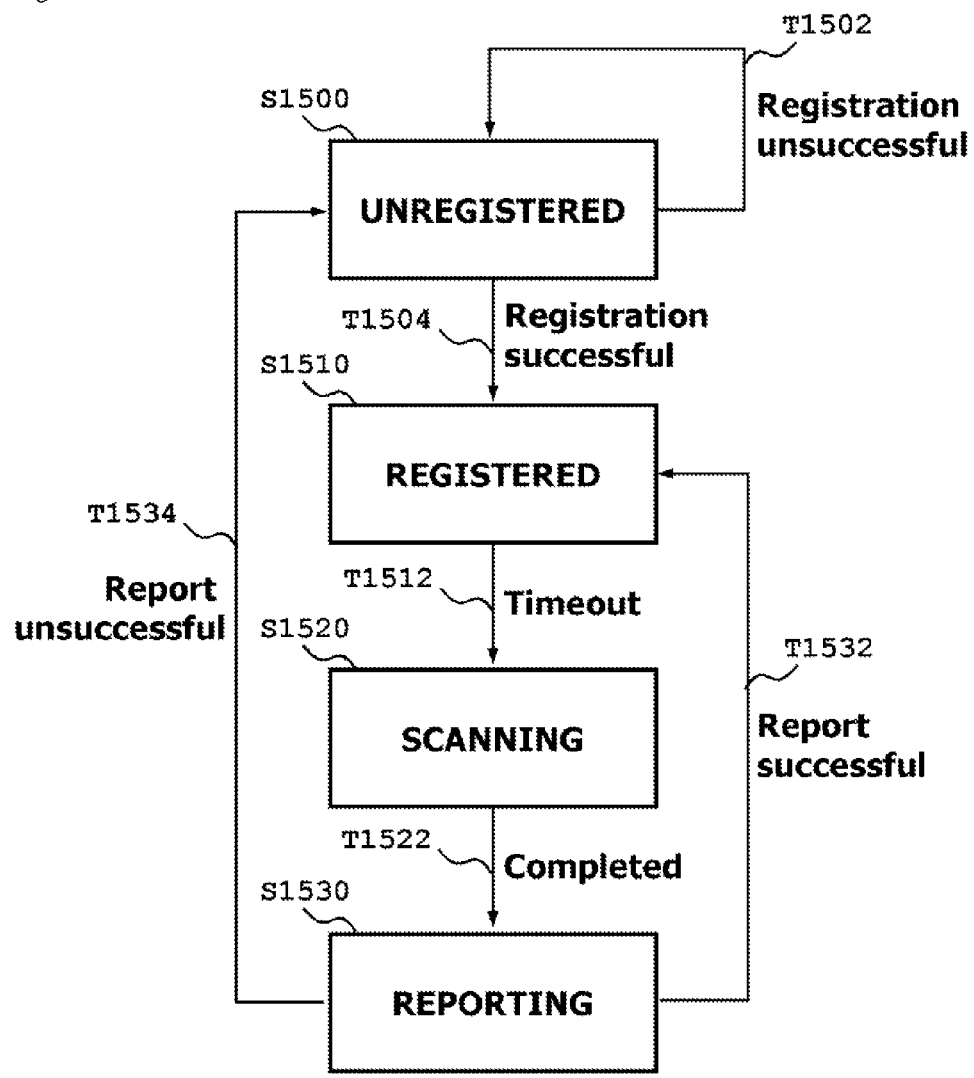

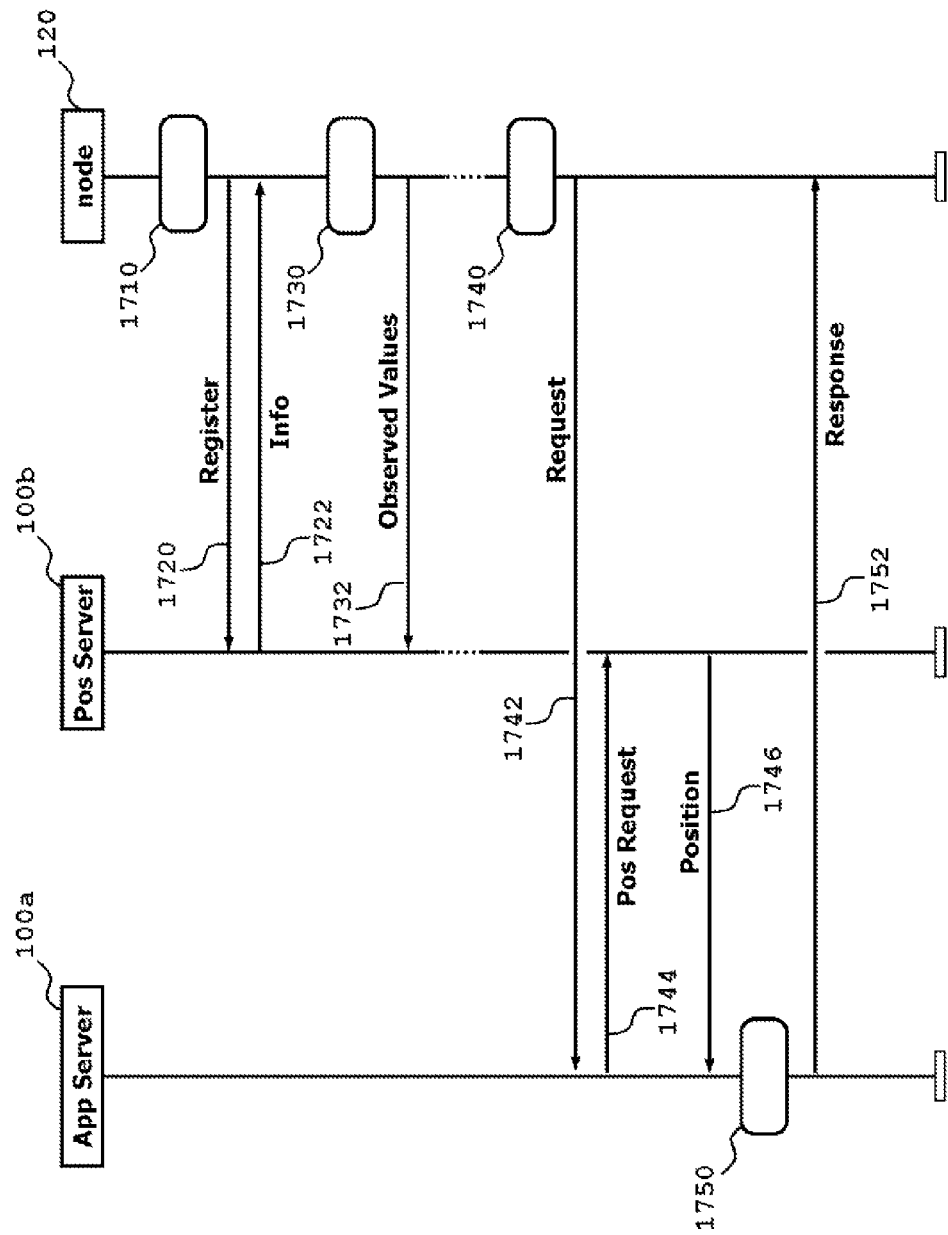

METHOD FOR DETERMINATION OF WIRELESS TERMINALS POSITIONS AND ASSOCIATED SYSTEM AND APPARATUS THEREOF

TECHNICAL FIELD

This invention relates to the field of wireless communications. More particularly, it concerns the determination of the position of a single or plurality of wireless communication devices using the signals transmitted and received during wireless communications.

BACKGROUND ART

With the proliferation of wireless communications technology, more and more devices are equipped with wireless communications capabilities, such as Bluetooth, IEEE 802.11, or Zigbee. With wireless communications capabilities, the devices are no longer tethered to a fixed location, and can freely move about together with the users. This gives rise to an important application for wireless devices: to be able to provide location and navigation related services. The ubiquity of Global Positioning System (GPS) has allowed users to tell their current locations through the use of GPS-equipped devices. However, in urban areas, the presence of high-rise buildings blocking line-of-sights to GPS satellites has resulted in difficulties of locating one's position using GPS. Some cellular devices use cellular base stations to assist in GPS positioning. In recent years, the high availability of wireless local area network (WLAN) hotspots in urban cities has led to the use of WLAN to locate devices in outdoor environment as well. For example, the Patent Document 1 (US Patent Application Publication US2007/0004428A1) teaches the method of monitoring WLAN access points in a target area to indicate movements.

While the afore-mentioned methods are shown to be successful in outdoor environment, there has been increasing interest to perform location determination in indoor situation where these methods are either impractical or have poor performances. To extend these method, one approach taught by the Patent Document 2 (U.S. Pat. No. 7,412,248B2) is to estimate the virtual location of base stations by a mobile device while the mobile device is able to tell its own location through, say, GPS, and then to make use of these virtual locations to continue to determine the mobile device's location when GPS is no longer available. The Patent Document 3 (U.S. Pat. No. 7,570,927B2) differentiates between location-capable nodes (i.e. nodes that can determine their own locations independently, e.g. using GPS) and location-incapable nodes. It then discloses a method of determining the location of location-incapable nodes through transmission of location determination information by the location-capable nodes. These methods require there to be nodes with location determination capabilities that are independent from the wireless communications, which may not always be possible in some deployment scenarios. It would be desirable and have wider applicability if the location of the mobile device can be determined only from parameters related to the wireless transmission.

One possible approach to determine location only from parameters of the wireless communications is to make use of the Received Signal Strength Indication (RSSI), Angle of Arrival (AOA), Time of Arrival (TOA), or Time Differential of Arrival (TDOA) to infer the distance between a mobile device and a fixed anchor point. Only methods that use only RSSI can have wide applicability, as specialized or expensive hardware are required to perform the measurements of the other wireless transmission parameters, which cannot be taken using readily available wireless chipset on the market.

One popular technique utilizing only the RSSI is to use what is known as a fingerprinting method, which involves observing and recording the RSSI from a set of base stations at different points of the area where location detection is needed. This set of recorded RSSI forms the fingerprint of that particular point, hence the name of this method. Thereafter, when the mobile device needs to know its position, it compares its currently observed RSSI from the same set of base stations with the recorded fingerprint, and determines its location as the point where the observed RSSI least deviates from the recorded fingerprint. One variation of this fingerprinting method is disclosed in the Patent Document 4 (U.S. Pat. No. 7,660,591B1). In the Patent Document 4 (U.S. Pat. No. 7,660, 591B1), in addition to taking the measurements of RSSI at a plurality of locations, the known transmit power is also subtracted from each of the RSSI measurements to produce a Propagation Loss Vector (PLV) for each location of the plurality of locations. This basically removes variations due to the transmitter's transmit power when using the fingerprinting method.

The main problem with the fingerprinting method is that prior RSSI needs to be observed and recorded at every point in the area of location determination, making it not feasible in some deployments. Some other techniques tries to reduce or eliminate the burden of having to perform prior calibration is to make use of probabilistic methods in addition to comparing between observed RSSI and recorded fingerprints. For example, the Patent Document 5 (U.S. Pat. No. 7,403,784B2) discloses a method for estimating a location of a plurality of wireless terminals where a Bayesian algorithm is applied to the signal strength measurements to estimate the location of each wireless terminal. Further, the Patent Document 6 (PCT Patent Application Publication WO 2007/021071A1) teaches a method of determining a location of a mobile communication terminal where weights are assigned to the received signal strength from different base stations. The weights are determined statistically. In the Patent Document 7 (U.S. Pat. No. 7,821,453B2), an iterative method is disclosed where Kalman filter is used to continuously refine the estimated position of a plurality of nodes separately such that in each iteration, the inter-node distance between the said plurality of nodes is used in the estimation of the position of one of the nodes.

Other techniques include combination of different location determination approaches to achieve better accuracy as described in the Patent Document 8 (U.S. Pat. No. 7,751, 827B2), using different wireless communications technologies as disclosed in the Patent Document 9 (US Patent Application Publication US2010/0105409A1).

CITATION LIST

Patent Literature

[PTL 1] US Patent Application Publication US2007/ 0004428A1, Morgan et al, "Continuous data optimization of moved access points in positioning systems", Jan. 4, 2007
[PTL 2] U.S. Pat. No. 7,412,248B2, McNew et al, "System and method for location determination", Aug. 12, 2008
[PTL 3] U.S. Pat. No. 7,570,927B2, Correal et al, "Decentralized wireless communication network and method having a plurality of devices", Aug. 4, 2009

[PTL 4] U.S. Pat. No. 7,660,591B1, Krishnakumar et al. "Propagation loss model based indoor wireless location of stations", Feb. 9, 2010

[PTL 5] U.S. Pat. No. 7,403,784B2, Ju et al, "Method and Apparatus for positioning a set of terminals in an indoor wireless environment". Jul. 22, 2008

[PTL 6] PCT Patent Application Publication WO2007/021071A1, Kim et al. "Method and system for determining position of mobile communication device using ratio metric", Feb. 22, 2007

[PTL 7] U.S. Pat. No. 7,821,453B2, Wu et al, "Distributed iterative multimodal sensor fusion method for improved collaborative localization and navigation", Oct. 26, 2010

[PTL 8] U.S. Pat. No. 7,751,827B2. Poykko et al, "Method and system for estimating the position of a mobile device", Jul. 6, 2010

[PTL 9] US Patent Application Publication 2010/1105409A1, Agarwal et al, "Peer and composite localization for mobile applications", Apr. 29, 2010

[PTL 10] US Patent Application Publication US2009/0153402A1, Doh et al, "Regional positioning method and apparatus in wireless sensor network", Jun. 18, 2009

SUMMARY OF INVENTION

Technical Problem

In all the above methods of the prior arts, the accuracy of position estimation is constrained by the area of the determination and the number of fixed base stations in the area. Due to the inverse proportionality between the distance and RSSI, when the distance between the base station and the mobile device is large, the accuracy will be limited by the smallest change in position to produce an observable change in RSSI. Hence, to have a certain level of accuracy, the number of base stations must be increased. When the number of base stations is increased, the Patent Document 10 (US Patent Application Publication US2009/0153402A1) discloses a method of selecting the base stations to use for determining the position of mobile device by removing base stations having obstacle factor which causes error in a distance measured by the mobile device. However, this is still susceptible to multi-path fading issues, where multiple transmissions between two nodes can produce different RSSI values due to the signals traversing different paths. Such issues can be especially profound in a crowded and dynamic environment, such as within the cabin of a train, or in a shopping mall where there is a high volume of people moving around.

Solution to Problem

It is thus an object of the present invention to overcome or at least substantially ameliorate the afore-mentioned disadvantages and shortcomings of the prior art.

Specifically, it is an object of the present invention to provide a position estimation method to estimate the position of wireless communications nodes using parameters of the wireless transmissions, said method comprising:

a signal strength collection step where parameters of wireless transmission are collected from wireless communications nodes;

a virtual anchor selection step where for each target node whose position is to be estimated, one or more wireless communications nodes are selected to be virtual anchors based on some criteria; and a position estimation step where position of the target node is estimated using the parameters of wireless transmissions associated with the selected virtual anchors and the target node;

wherein a position refinement iteration where the virtual anchor selection step and the position estimation step are re-iterated until there is no significant change in estimated positions.

In one preferred embodiment, the position estimation method is provided wherein the virtual anchor selection step may select a first communications node as a virtual anchor for the position estimation of a second communications node, such that said first communications node is a target node in a previous position refinement iteration.

In another preferred embodiment, the selection of a first communications node as a virtual anchor for the position estimation of a second communications node is based on the proximity between the said first and second communications nodes. Further, said proximity between the said first and second communications nodes is deduced based on the received signal strength indicator between the first and second communications nodes.

In a further preferred embodiment, the selection of a first communications node as a virtual anchor for the position estimation of a second communications node is based on the past estimates of the positions of the said first communications node.

In a yet further preferred embodiment, the position estimation method further comprises a step of choosing among a plurality of criteria to use for virtual anchor selection, wherein each of the said plurality of criteria measures the suitability of a first communications node as a virtual anchor for the position estimation of a second communications node.

In another preferred embodiment, the selection of a first communications node as a virtual anchor for the position estimation of a second communications node is based on the weighted average of different criteria that measures the suitability of said first communications node as a virtual anchor.

In yet another preferred embodiment, the set of weights used is dynamically determined based on the current environment of the wireless communications nodes.

In a further preferred embodiment, the position estimation method further comprising a step of assigning a weight to each virtual anchor selected from the virtual anchor selection step such that said weights are used in the position estimation step in such a way that each factor contributing to the position estimation that is associated with a virtual anchor is multiplied by the weight assigned to said virtual anchor. The weights assigned to each virtual anchor may be modified during each position refinement iteration.

In a yet further preferred embodiment, the position estimation method further comprises a step of determining a set of communication nodes that are potential virtual anchors for the position estimation of a target node such that in the signal strength collection step, only parameters of wireless transmissions involving the said set of communications nodes are collected.

Advantageous Effects of Invention

The present invention has advantage of the fact that mobile nodes are closer to the target mobile node than the access points in most typical deployments, thus eliminating the need to deploy more access points or fixed anchors for the purpose of position determination.

BRIEF DESCRIPTION OF DRAWINGS

FIG. 12 shows a message sequence diagram of the message exchange between server and nodes according to an ad-hoc mode of operation described in a preferred embodiment of the present invention.

FIG. 13 shows a message sequence diagram of the message exchange between server and nodes according to an infrastructure mode of operation described in a preferred embodiment of the present invention.

FIG. 14 shows a message sequence diagram of the message exchange between server and nodes according to a hybrid mode of operation described in a preferred embodiment of the present invention.

FIG. 15A illustrates the state transition diagram for nodes according to a preferred embodiment of the present invention.

FIG. 17 depicts another exemplified message sequence diagram of the message exchange between the node, position server, and application server according to a preferred embodiment of the present invention.

DESCRIPTION OF EMBODIMENTS

Figure 1:
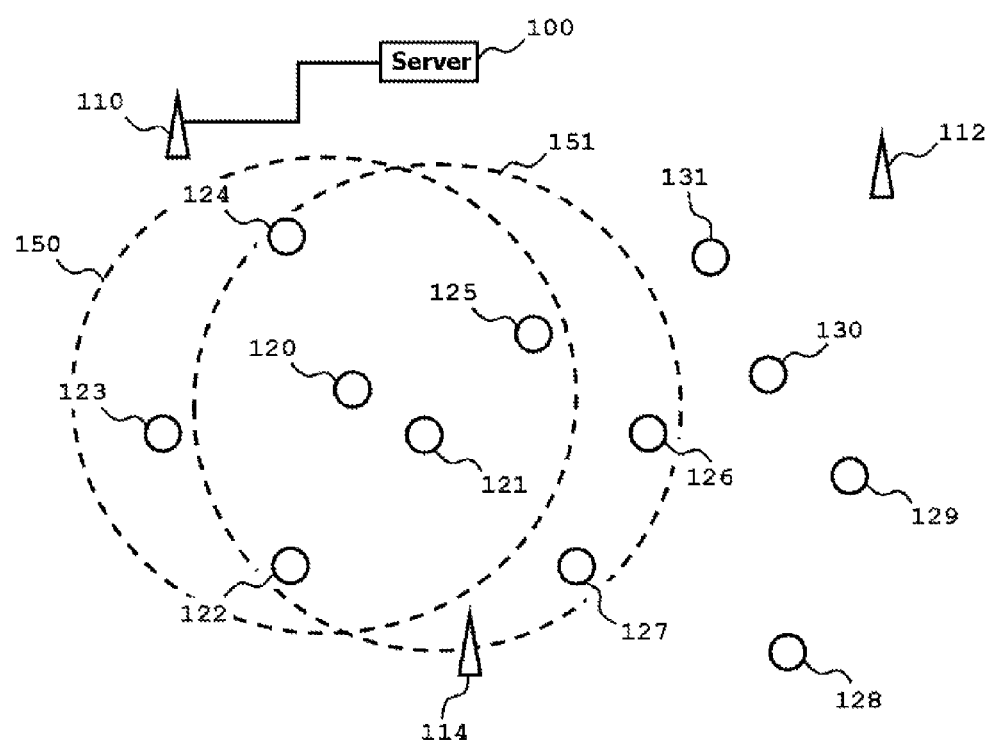
FIG. 1 depicts an example deployment system according to a preferred embodiment of the present invention.

In the following description, for purposes of explanation, specific numbers, times, structures, protocol names, and other parameters are set forth in order to provide a thorough understanding of the present invention. However, it will be apparent to anyone skilled in the art that the present invention may be practiced without these specific details.

The present invention overcomes the problems associated with the prior art by selecting one or more mobile nodes as "virtual anchors" when estimating the position of a target mobile node. This takes advantage of the fact that mobile nodes are closer to the target mobile node than the access points in most typical deployments, thus eliminating the need to deploy more access points or fixed anchors for the purpose of position determination. After obtaining an initial estimation of the position of the target mobile node, the target mobile node can serve as virtual anchors to estimate the positions of other mobile nodes, which can then be used to further refine the position estimate of the target mobile node.

In wireless positioning systems, it is often necessary to deploy a plurality of anchor points (i.e. nodes with known positions) to assist in position estimation of mobile nodes. These anchor points may be access points, base stations, or simply mobile stations with known positions (for example, surveillance cameras or display panels that communicate wirelessly). For the present invention, "virtual anchors" are used. These are mobile nodes, portable nodes or portable base stations/access points ("portable" means that the nodes/base stations/access points are placed almost fixed but sometimes the places are changed (the nodes are moved)) that are selected to act like anchor points when estimating positions of other mobile nodes. When they act as virtual anchors, the previously estimated positions of the virtual anchors are used as if they are the known (or actual) positions. Hence, virtual anchors are mobile clients or portable clients/access points/base stations whose position are estimated by the system, and the estimated positions are then used to allow these mobile clients to act like fixed anchors when estimating the positions of other mobile clients. In this sense, fixed nodes can be also virtual anchors when positions of the nodes are estimated by the system.

There can be a mobile client whose position is known through other means (such as being deployed on a fixed installation like a surveillance camera, or having other hardware like a Global Positioning System that can tell the position). Such mobile client can still be participating in the position estimation system as disclosed by the present invention. This type of mobile client serves two purposes: firstly, it can be used as virtual anchors when estimating the positions of other mobile nodes; and secondly, its position can be estimated by the system, and the difference in its known and estimated positions can be used as a corrective feedback to the system. This kind of mobile client is referred to as "permanent virtual anchor" in the following preferred embodiments.

FIG. 1 illustrates a deployment according to a preferred embodiment of the present invention, with fixed nodes 110, 112 and 114, a plurality of mobile nodes 120 through 131, and a server 100. The fixed nodes may be access points providing wireless communications access to the mobile nodes. One typical scenario will be that the fixed nodes are IEEE802.11 access points and the mobile nodes are IEEE802.11 stations. The fixed nodes may also be stations with fixed positions acting as anchors for the purpose of determining the positions of the mobile nodes. For example, in FIG. 1, it may be that only fixed node 110 is an IEEE802.11 access point, while fixed nodes 112 and 114 are IEEE802.11 stations with a known, fixed position.

In this example, for purpose of clarity, it is assumed that the server 100 is performing the algorithm of estimating the positions of the one or more mobile nodes. In later embodiments, it will be shown that the present invention may be carried out in a distributed manner. It is further assumed that the server 100 is connected to one of the access points (in the case of the illustration in FIG. 1, server 100 is connected to access point 110) via wired network. It should be apparent to anyone skilled in the art that the server 100 may be connected to a plurality of access points in any combination, or may have wireless communications capability such that a wired connection to the access point is not necessary, or the server may physically be implemented on any of the access points.

When the server 100 needs to estimate the position of a mobile node, conventional methods would use the RSSI of mobile node's transmission observed by fixed nodes 110, 112 and 114 to deduce the distances of the mobile node from each of the fixed nodes, and perform triangulation to determine the position of the mobile node. Alternatively, a fingerprinting method can be used where the RSSI of the transmission of each fixed node observed by the mobile node is used to match against a fingerprint map to determine the position of the mobile node. However, as the fixed nodes are deployed to provide position determination of mobile nodes over a large area, the distances between the fixed nodes and the mobile node may be quite large such that the required accuracy cannot be obtained by simply using RSSI.

In the present invention, the server 100 will select a set of mobile nodes to act as virtual anchors when determining the position of a target mobile node. For example, when estimating the position of target mobile node 120 in FIG. 1, the set 150 of mobile nodes 121, 122, 123, 124 and 125 may be selected to be virtual anchors. The observed RSSI values for transmissions associated with the set 150 of selected virtual anchors and the mobile node 120 are then used to estimate the positions of mobile node 120 (either by triangulation, fingerprinting, or otherwise) based on the previously estimated positions of the set 150 of selected virtual anchors. Similarly, when estimating the position of target mobile node 121 in FIG. 1, the set 151 of mobile nodes 120, 122, 124, 125, 126 and 127 may be selected to be virtual anchors. The observed RSSI values for transmissions associated with the set 151 of selected virtual anchors and the mobile node 121 are then used to estimate the positions of mobile node 121 (either by triangulation, fingerprinting, or otherwise) based on the previously estimated positions of the set 151 of selected virtual anchors.

Note that by "observed parameters (e.g. RSSI values) of transmissions associated with a first node", it is assumed that a second node is observing wireless transmissions made by the said first node, regardless of whether the said second node is an intended recipient of the wireless transmissions. This is possible in some wireless technologies, such as IEEE802.11, IEEE802.15.4 or Bluetooth, where the source identification of the transmitting node is given in the frame header. Thus, other nodes monitoring to the wireless medium for transmission can identify the transmitting node and associate a parameter (such as RSSI) to the transmission.

By selecting a set of mobile nodes to act as virtual anchors when estimating the position of a target mobile node, the present invention overcomes the problem of having large distances between the fixed nodes and the mobile node such that the required accuracy cannot be obtained by simply using RSSI. This is because the distances between the virtual anchors and the target mobile node can be arbitrarily small, and that the number of virtual anchors can be larger than the number of fixed nodes (thus increasing the accuracy of position estimation since more RSSI values are used to estimate the position). In the following preferred embodiments, the methods of the present invention will be described in greater details.

Figure 2:
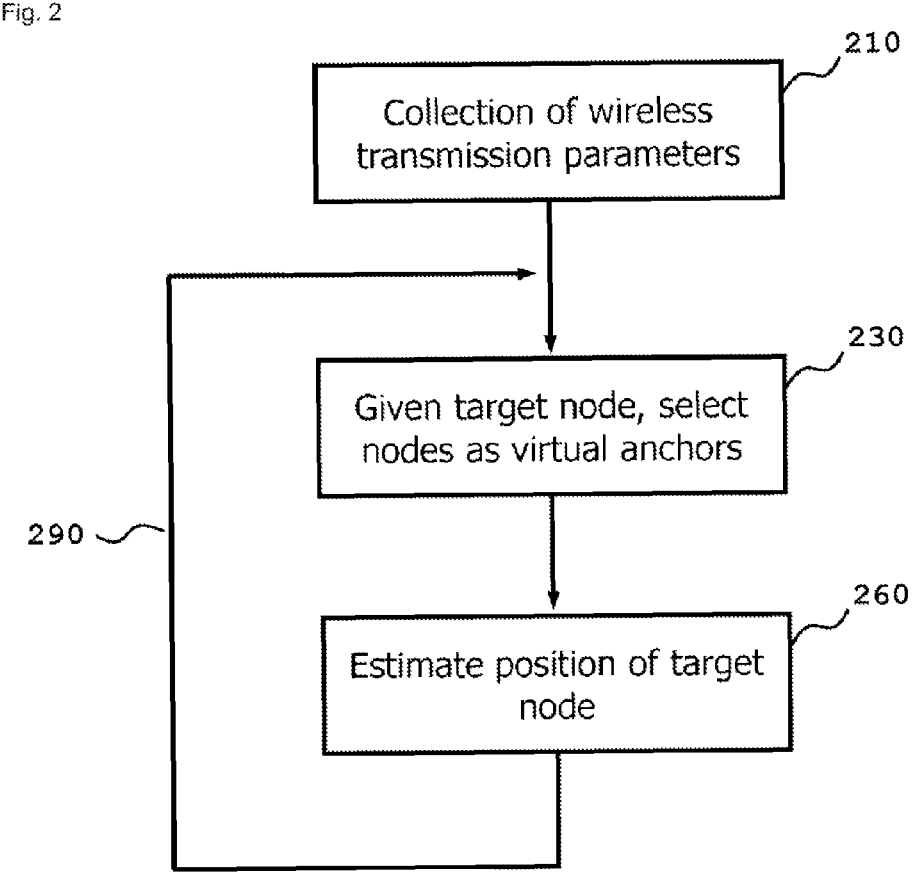
FIG. 2 shows the flowchart illustrating the basic method of determining the positions of wireless terminals according to a preferred embodiment of the present invention.

FIG. 2 shows the flowchart of the basic algorithm according to one preferred embodiment of the present invention. In essence, the algorithm comprises three basic steps: wireless transmission parameters collection step 210 where parameters of the wireless communications are collected from fixed nodes and mobile nodes; the virtual anchor selection step 230 where given a target node whose position is to be estimated, a set of mobile nodes is selected to act as virtual anchors; and the position estimation step 260 where the position of the target mobile node is estimated based on the parameters collected in step 210 associated with the wireless transmission involving the target mobile node and the selected set of virtual anchors. Once the position of the target node is estimated, the algorithm may perform another iteration 290 of the virtual anchor selection step 230 and position estimation step 260 for another target node. During this iteration, the estimated position of a mobile node from a previous iteration may be used if the said mobile node is selected as a virtual anchor. The following gives an example of a run through using the deployment illustrated in FIG. 1.

After collecting the wireless transmission parameters in step 210, it is assumed that during the first iteration of steps 230 and 260, mobile node 120 is the target mobile node for position estimation. Assuming none of the position of any mobile nodes 120 through 131 have previously been estimated, none of the mobile nodes can be selected as a virtual anchor. Hence step 230 yields no virtual anchor. Thus, in step 260, the position of target mobile node 120 can only be estimated based on the collected parameters associated with wireless transmissions involving mobile node 120 and the fixed nodes 110, 112 and 114. This would result in a coarse position estimation of node 120, since the distances from mobile node 120 and the fixed nodes may be relatively great. Assuming in the subsequent iteration, the mobile node 121 is the target mobile node for position estimation. Since position of mobile node 120 has previously been estimated, it is selected as a virtual anchor. Thus the position estimation step 260 will estimate the position of mobile node 121 based on collected parameters associated with wireless transmission involving mobile nodes 120 and 121 and fixed nodes 110, 112, and 114. This process is re-iterated, and in one of the subsequent iterations, mobile node 120 is again the target mobile node for position estimation. Now, since the positions of most of the mobile nodes have already been estimated in one of the previous iterations, the virtual anchor selection step 230 may now yield more selected virtual anchors, for example, the set 150 of mobile nodes 121, 122, 123, 124, and 125. As these virtual anchors are much closer to the target mobile node 120, the position estimation step 260 will give a much more accurate refined estimation of mobile node 120 position. This refined estimation can then be used in subsequent iterations 290 to provide even more refined position estimation for other mobile nodes. This refinement process can continue on until a pre-specified number of iterations is exceeded, or until there is no significant changes in the estimated positions of the mobile nodes.

As apparent from the above description, the selection of virtual anchors given a target mobile node would affect how fast this refinement process will take. Such selection may be based on a wide range of factors. Firstly, the virtual anchor may be selected based on its estimated proximity to the target mobile node. This proximity can be estimated from the RSSI observed by the candidate virtual anchor of the transmission from the target mobile node. This proximity can also be estimated from the RSSI observed by the target mobile node from the candidate virtual anchor. For example, the server may select a pre-specified number of mobile nodes with the best observed RSSI on transmissions to/from the target node, or select all the mobile nodes with observed RSSI of transmissions to/from the target node that are better than a pre-specified threshold. This proximity can further be estimated from the previously estimated positions of the candidate virtual anchor and the target mobile node, if available. For example, the server may select a pre-specified number of mobile nodes that are closest to the target node based on their previously estimated positions, or select all the mobile nodes within a pre-specified distance from the target node based on their previous estimated positions.

Secondly, the virtual anchor may be selected based on the reliability of its estimated positions. For example, if the previous consecutive estimated positions of a virtual anchor have little or no difference, then the reliability of the estimated position of the virtual anchor can be said to be high. This reliability may be decided by RSSI on transmission between virtual anchor and fixed nodes (such as access points). For example, if the RSSI is good enough or/and stable enough, the reliability is high. Thirdly, the virtual anchor may be selected based on the outcome of a random process (e.g. for each mobile node, a random number is generated, and if the generated number is greater than a specified value, the mobile node is chosen as a virtual anchor). Selecting virtual anchor randomly is beneficial as it provides a non-zero possibility of virtual anchors being selected to cover situations that other selection criterion cannot cover. This is similar to the concept of adding stochastic noise to improve accuracy of classifiers. Alternatively, a neural network may be trained to choose the virtual anchors. Such a neural network may take the observed RSSI values by a potential node on the transmission to/from the target mobile node as the input, and have a single output perceptron that indicates whether the potential node should be selected as a virtual anchor. The neural network may also take in the RSSI values and coordinates of all the mobile nodes, and have an output layer where each output perceptron indicates whether an associated mobile node should be selected as a virtual anchor. As other approach, it is also possible to select virtual anchor by preconfigured information. For example, in the shopping mall scenario, mobile nodes could be nodes of customers or nodes of employee. In this case, mobile nodes used by employee could be prioritized to be selected as virtual anchor. Therefore, such preconfigured information also could be used for virtual anchor selection. A special case is when there are wireless "mobile" nodes deployed specifically to act as virtual anchors. Such "mobile" nodes have known locations, such as being on a fixed installation or have other means of knowing their own positions with relative accuracy. Their main purpose is to assist in determining the positions of other mobile nodes. Unlike fixed anchors, such "mobile" nodes will also participate in position estimation communications with the servers. We refer to these as "permanent virtual anchors".

As other criteria, battery consumption of mobile node may be used for virtual anchor selection. In order to perform location calculation, virtual anchor needs to transmit signal. In case virtual anchor does not have any data to transmit, one approach is that virtual anchor transmits signal only for measurement purpose. The transmission signaling for measurement purpose may be only reference symbol, combination of reference symbol and dummy data, or combination of reference symbol and assistant data for positioning. Here, assistant data is data to be used for positioning like RSSI information, estimated position, and so on. In order to minimize unnecessary transmission from virtual anchor, virtual anchor selection may check whether mobile node has data to transmit or not. Virtual anchor selection may prioritize mobile node which has data to transmit as virtual anchor. This prioritization could be simply based on whether mobile node is active or idle.

Further, the virtual anchor may be selected based on all the above criteria by assigning a weight factor to each of the criteria, and selecting the virtual anchors based on the weighted outcomes from these criteria. The weights may be changed based on the situation. For example, in a crowed shopping mall, a set of weights may be used that is different from the set of weights that will be used for the case of a train cabin. The weights of the same environment may also change based on the time of day. For example, the weights used for position estimation in a train cabin may have different values during peak hours and off-peak hours. Different sets of weights can also be used when the train is moving as compared to when the train is at a station. One would note that weights can be of zero value. Hence, in the special case of the weight of a first criterion is non-zero while the weights of the other criteria are zero, it is equivalent to choosing only the said first criterion for the selection of virtual anchors. The set of weights may also be modified based on the observed parameters of wireless transmission. This may be done using statistical approach such as extended Kalman filter or Bayesian classifier. This may also be done using a trained neural network that takes in the RSSI values at the input layer, and has an output layer where each output perceptron gives the weights associated to each of the selection criterion.

Figure 3:
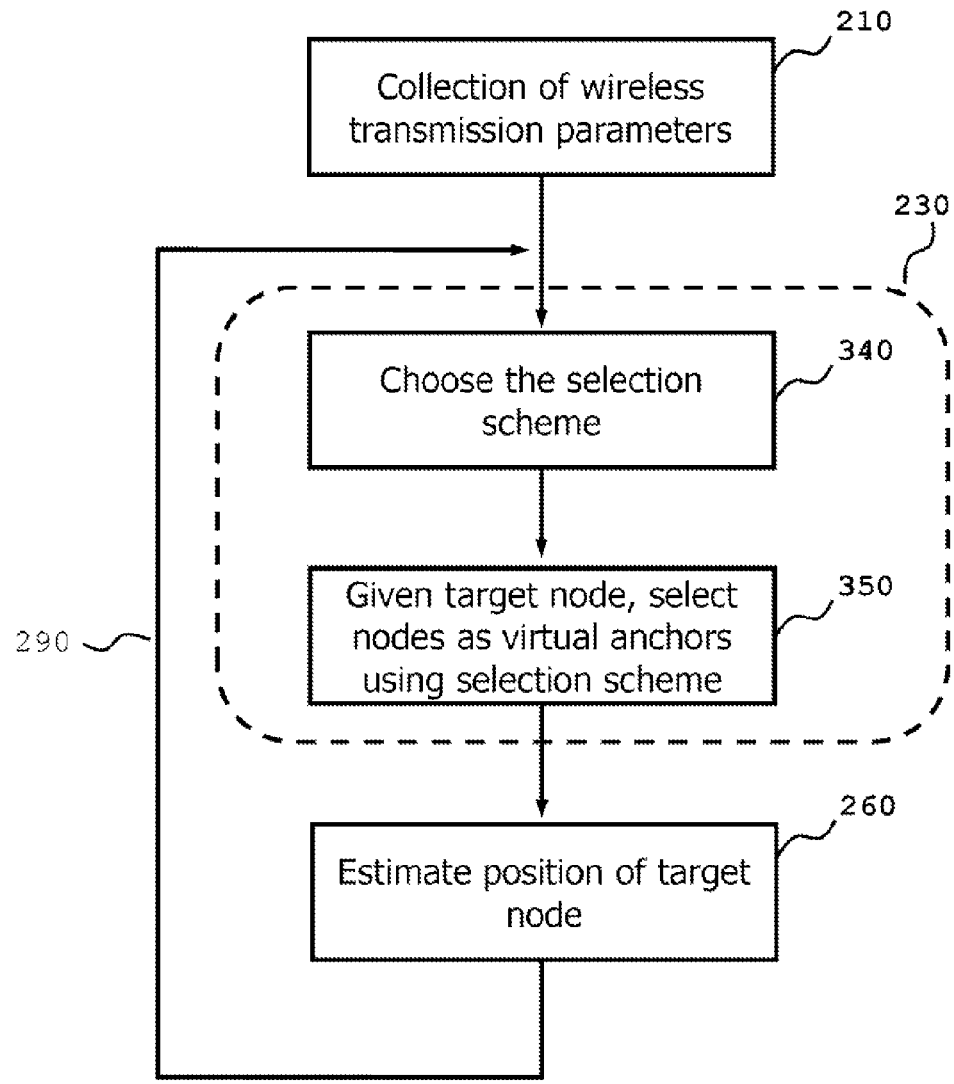
FIG. 3 shows the flowchart illustrating the basic method of determining the positions of wireless terminals with a refined virtual anchors selection step according to a preferred embodiment of the present invention.

Hence, when selecting the virtual anchors, one additional step is to choose the virtual anchor selection scheme. This is illustrated in FIG. 3 where the virtual anchor selection step 230 is shown to further comprise a step 340 to choose the selection scheme, and a step 350 to use the chosen selection scheme to select the virtual anchors. As described previously, the selection scheme may be chosen based on various factors. For example, it can be based on the environment, such as using one scheme for estimating positioning of passengers in a train cabin where there will be less movement while the train is moving, and then using another scheme when train doors open at a station where there will be a sudden flurry of movement. A scheme might be used for detecting positions of passengers in a train cabin, while another scheme is used for detecting positions passengers on the platforms. In a school deployment to detect the positions of students' laptops/tablets within the school compound, different schemes might be used during lessons time and recess time. The selection scheme may also be chosen based on the collected RSSI values. For example, if the variance of the collected RSSI values is larger than a pre-specified value, then a selection scheme to include less virtual anchors might be used so as to reduce the possibility of introducing errors into the estimation. Conversely, when the deviations in collected RSSI values are small, then a selection scheme to include more virtual anchors might perform better. The selection scheme may also be chosen based on the indication of how "noisy" the system is (the system is said to be "noisy" when the position estimation has high probability of error, possibly due to fluctuations in the observed wireless transmission parameters leading to noise being introduced into various processing blocks of the system). Recall that permanent virtual anchors are mobile clients with known positions. Position estimates of these permanent virtual anchors can be compared against their known positions to serve as an indication of how noisy the system is. When the system is very noisy, it would be beneficial to use a selection scheme to include less virtual anchors so as to reduce the possibility of introducing errors into the estimation. Conversely, when the system is not so noisy, then a selection scheme to include more virtual anchors might perform better.

Another selection scheme may be to select devices with same hardware type as those devices that are already behaving as access point or virtual anchor, so that propagation constants of these devices (i.e. Crx and Ctx as described later in this specification) can be aligned. In this case, these parameters would not need to be exchanged between these devices, and then traffic among devices will be reduced.

Yet another selection scheme may be to select a device whose position is estimated as closer to a pre-defined location (position). When access point or virtual anchor is placed at the pre-defined location, it is pre-determined that the position estimate of the access point or virtual anchor will be within acceptable estimation accuracy, which could be less than pre-determined estimation error rate. Usually, there will be no positioning device located at the pre-determined location. However, when a device which has indeed been positioned at or close to the pre-defined location, it will be selected as a virtual anchor since its position can be ensured within the acceptable estimation accuracy. Furthermore, it would reduce cost for configuration and maintenance of access point placement because it requires no fixed access point to be placed at such pre-defined location. The validity of the pre-defined location may be dependent on time (or other environment factors) as well. An example of such application might be the case of train station staff standing at pre-defined positions along the station platform when a train arrives. Since the staff will always stand at the pre-defined positions, once the estimated position of the device carried by the staff is estimated to be close to one of these pre-defined positions, the system can assume that the position of the said device to be equal to the said pre-defined position with zero estimation error. This will make the said device to be an excellent candidate to be selected as a virtual anchor. When the train leaves the platform, the staff will again move around the station. Then, the pre-defined position is no longer valid, and the system will no longer assume that device to be at the pre-defined position with zero estimation error.

It would be possible for a device which is selected as a virtual anchor to be configured by the server, other node or itself with specific wireless transmission and/or receiving parameters such as transmission power, antenna gain for transmission and/or receiving, etc. This is so that the server can generate the fingerprint map easily with already known configuration parameters with regard to the new virtual anchor. Yet another possibility is to select virtual anchor based on the estimated position of potential virtual anchor in such a way that there is minimal amount of symmetry in the positions of fixed anchors and selected virtual anchors. Symmetry in known anchors points is not desirable for fingerprint generation because it creates maxima points in the fingerprint map that are mirror images of each other along the axis of symmetry. When this happens, the position estimation steps may select these maximal points alternatively, introducing instability into the system. Hence, selecting virtual anchor in such a way that there is minimal amount of symmetry would help to reduce the amount of instability into the system.

It should be noted that it is apparent that the number of virtual anchors also could be selected based on virtual anchor selection schemes, environment, or combination of both.

Figure 4A:
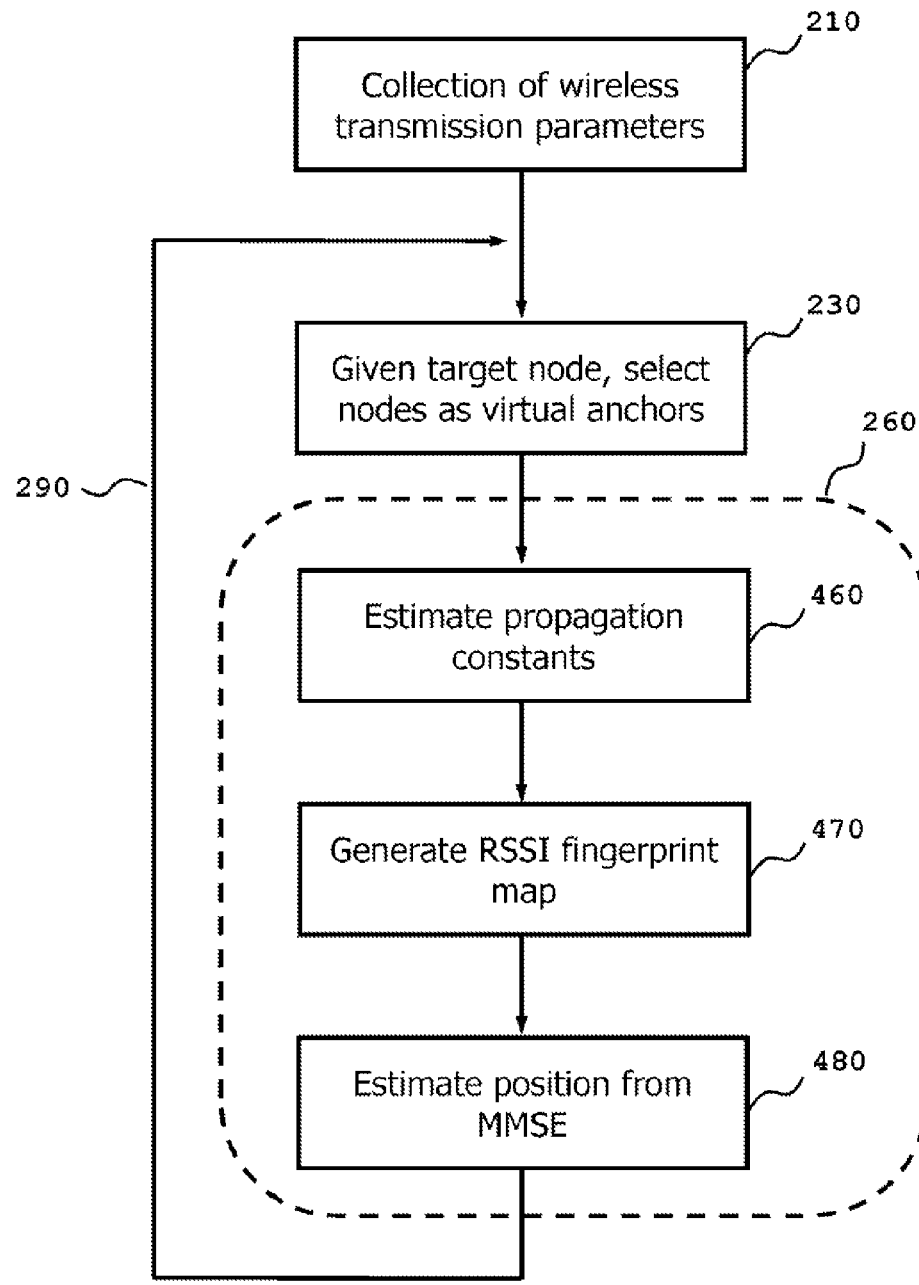
FIG. 4A shows the flowchart illustrating the basic method of determining the positions of wireless terminals with a refined position estimation step according to a preferred embodiment of the present invention.

Once the virtual anchors are selected, the parameters associated with wireless transmissions of the virtual anchors and the target mobile node can then be used to estimate the position of the target mobile node. Various methods can be used to estimate the positions based on the said parameters, including but not limited to triangulation and fingerprinting. FIG. 4A illustrates one such preferred method. In FIG. 4A, the position estimation step 260 further comprises the propagation constants estimation step 460, the RSSI fingerprint map generation step 470, and the minimum mean square error (MMSE) estimation step 480.

In one preferred embodiment, the received signal strength of wireless transmission is modeled according to:

$$RSSI = Ctx + Crx - F \cdot \log(d) \quad \text{(Eq. 1)}$$

where Ctx is the transmission antenna gain. Crx is the receiver antenna gain, F is the loss coefficient, and d is the distance between the receiver and transmitter. Ctx, Crx, and F are assumed to be constants given the same receiver and transmitter pair. Hence, in the propagation constants estimation step 460, these propagation constants associated to each virtual anchor are estimated based on the actual RSSI values collected in step 210. As the virtual anchors are themselves mobile nodes, it is reasonable to assume that the target mobile node will have similar physical properties and thus a good estimation of the propagation constants associated to the target mobile node can be obtained by taking average of the propagation constants associated to the virtual anchors. Alternatively, propagation constants associated with the target mobile node may be used based on estimates from previous iterations. The propagation constants may be all or part of the parameters (i.e. Ctx, Crx, and F) for all the devices or part of devices (e.g. based on device type, communication interface type, etc.).

With the propagation constants estimated, the same wireless transmission model according to (Eq. 1) can be used to generate the expected RSSI observed by the target mobile node and virtual anchors of each other's transmissions at different points in the area of detection. This is the RSSI fingerprint map generation step 470. Once the map is obtained, the actual observed RSSI can be compared against the map, and the point where the mean square error between the actual observed RSSI values and the expected RSSI values is the minimum will be the estimated position of the target node. This is the MMSE estimation step 480.

A person skilled in the art would appreciate that other methods may be used as well. For example, the propagation constants estimation step 460 may use a trained neural network to estimate the values of the propagation constants by having the RSSI values as input, and an output perceptron to give the value for each propagation constant. Alternatively, the transmission model in (Eq. 1) can be treated as a stochastic process with the addition of Additive White Gaussian Noise, and techniques such as extended Kalman filters or Bayesian estimation can be used to estimate the values of the propagation constants Ctx, Crx and F. Further, instead of using RSSI fingerprinting, another preferred approach is for the server to use (Eq. 1) to estimate the distance of each virtual anchor to the target node in step 470. This means that a circle centered at a virtual anchor with its radius given by the estimated distance between the virtual anchor and the mobile node gives the possible positions of the target node. Then, in step 480, the target node's position is estimated by a point which yields the minimum mean square distance from all the circles.

It is mentioned that the Ctx and Crx can be adjusted according to type of device (i.e. as access point, virtual anchor, client), so that more accuracy for the position estimation would be ensured. Ctx and Crx can be pre-defined or pre-measured per type of device and pre-configured (stored) on each device in a parameter table, or can be shared or exchanged between devices dynamically. For accurate estimation, the observed RSSI value may be considered in devices as that Ctx and Crx values are already included. Here the Ctx is transmission antenna gain value of a device which is the target of observation of the observed RSSI, and the Crx is receiver antenna gain value of a device which observes the observed RSSI. A device (i.e. server device) may estimate device position using the observed RSSI, Ctx and Crx which may be picked up from the parameter table or provided (exchanged) from other device.

RSSI values may be observed only among same type of devices, so that the estimation accuracy would be more accurate due to using Ctx and Crx already known among the devices for the estimation. This also helps that the devices need not to store the parameter table or to exchange among the devices because they are same values as what the device has, and then it can save memory consumption or reduce traffic for parameter (i.e. Ctx and Crx) exchange. Here, it can be detected whether devices are of the same type by, for example, verifying parts (bits) of the device's MAC address (i.e. vendor part or some specific part which may be assigned based on device type, etc.).

The receiver device may adjust the observed RSSI with consideration of receiver antenna gain (Crx) of the device, i.e. the receiver device may send to the server the observed RSSI with adjustment of Crx (i.e. RSSI+Crx), such that the server is not required to collect Crx values for all the devices and the traffic for parameters exchange will be reduced. This will also increase accuracy of the location estimation, because the adjusted observed RSSI values are already standardized without device dependent Crx values.

Figure 4B:
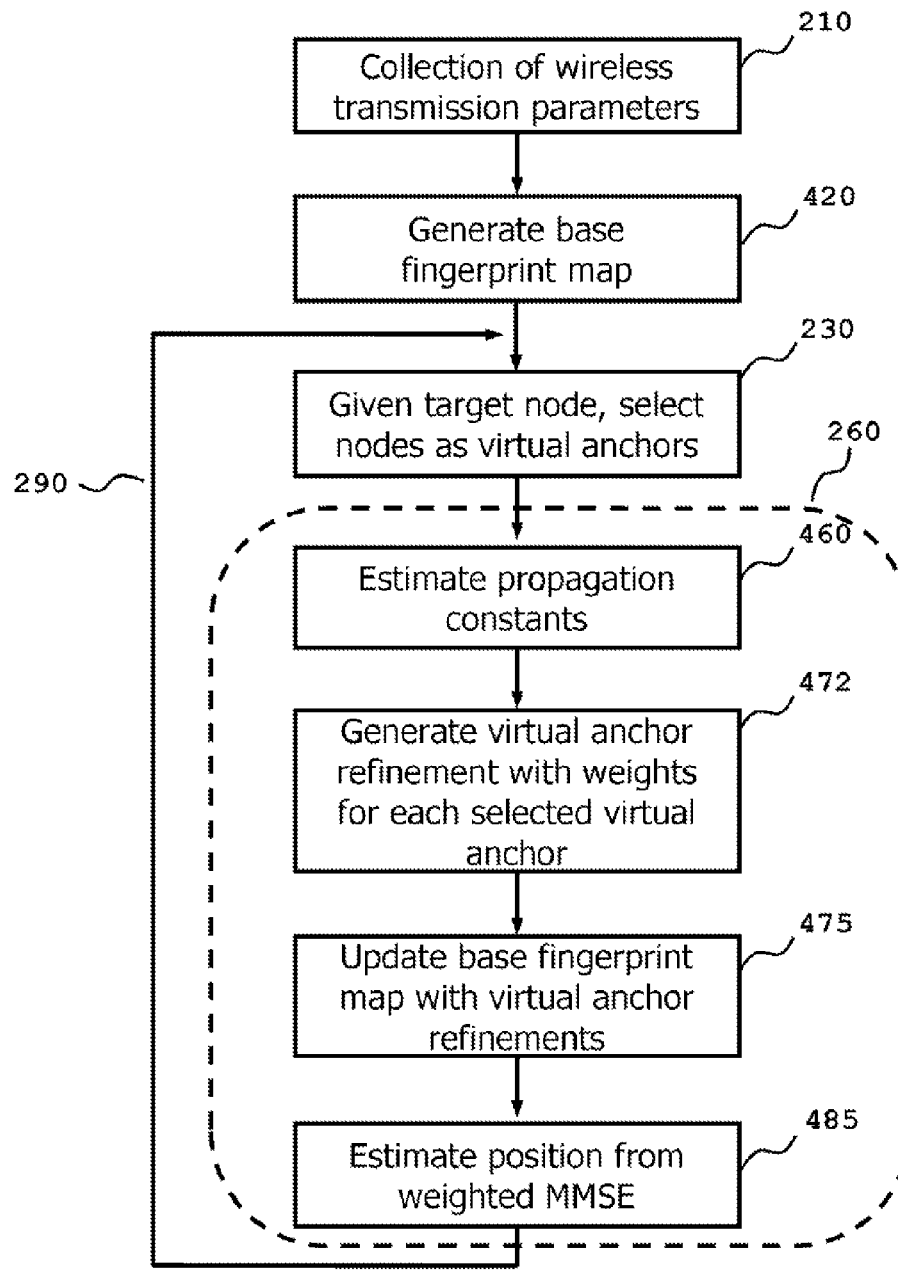
FIG. 4B shows the flowchart illustrating the basic method of determining the positions of wireless terminals with a refined position estimation step according to a preferred embodiment of the present invention.

Since the positions of the virtual anchors are themselves estimated, a possible approach to increase the accuracy may be to use a step-wise fingerprint refinement approach as illustrated in FIG. 4B. This involves the server first generating the RSSI fingerprint map only based on the expected RSSI values of transmissions involving the fixed nodes and the target node in step 420. For ease of description, this is referred to as the "base fingerprint map". In subsequent iterations, the base fingerprint map is refined to include the expected RSSI values of transmissions involving the virtual anchors as well. For ease of description, this is referred to as the "virtual anchor refinements". This is shown in FIG. 4B as steps 472 and 475. In step 472, a virtual anchor refinement is generated for each selected virtual anchor based on the observed parameters of transmissions associated with the virtual anchor and the target node. The base fingerprint map is then updated with the virtual anchor refinements in step 475 to produce a refined fingerprint map. Weights can be assigned to the base fingerprint map and the subsequent virtual anchor refinements. During the calculation of the mean square error of the actual observed RSSI values against the expected RSSI values in step 485, the weights are taken into account. This means that the error between observed transmission parameters and the refined fingerprint is multiplied by the associated weight. For example, the error between the observed RSSI of transmission from a fixed node and the refined fingerprint is multiplied by the weights associated with the base fingerprint map, whereas the error between the observed RSSI of transmission from a virtual anchor and the refined fingerprint is multiplied with the weight associated with the corresponding virtual anchor refinement. The weighted error are squared and averaged and the position with the minimum mean square error (called weighted MMSE) yields the estimated position of the target node in this iteration.

The weights can be modified and have different values during different iterations. One approach is to assign heavier weights to the base fingerprint map and assign zero weight to the virtual anchor refinements during the initial iterations, and as the estimated positions of the virtual anchors converges in subsequent iterations, the weights of the virtual anchor refinements can be increased. Each virtual anchor refinement can have a different weight assigned, and assigned weights are varied based on how reliable the estimated position of the associated virtual anchor is (e.g. if the estimated position of virtual anchor changes quite significantly from iteration to iteration, then the reliability is low, and the virtual anchor refinement may then be assigned lower weight). In such a scheme, the virtual anchor refinement associated with a permanent virtual anchor will have a weight such that the refinement will always be used since positions of virtual anchors are known. Another approach is to vary the set of weights associated to base fingerprint map and associated to each virtual anchor refinement based on the observed parameters of wireless transmission. This may be done using statistical approach such as extended Kalman filter or Bayesian classifier. This may also be done using a trained neural network that takes in the RSSI values, and has an output layer where each output perceptron gives the weights associated to each of the virtual anchor refinement.

The update or adjustment of fingerprint map may be performed even during position estimation from weighted MMSE in step 485, if the estimated location is less than a pre-determined accuracy (e.g. MMSE is more than a pre-determined value) or the target area of the position to be estimated is detected to have no or less impact after the update. In such cases, the steps 475 and 485 may be performed in parallel. The update of fingerprint map during the position estimation step may be performed normally and the fingerprint maps are maintained in 2-side or multiple-side buffers in the server. In this way, the fingerprint map can be always updated and estimation accuracy would be ensured.

Figure 4C:
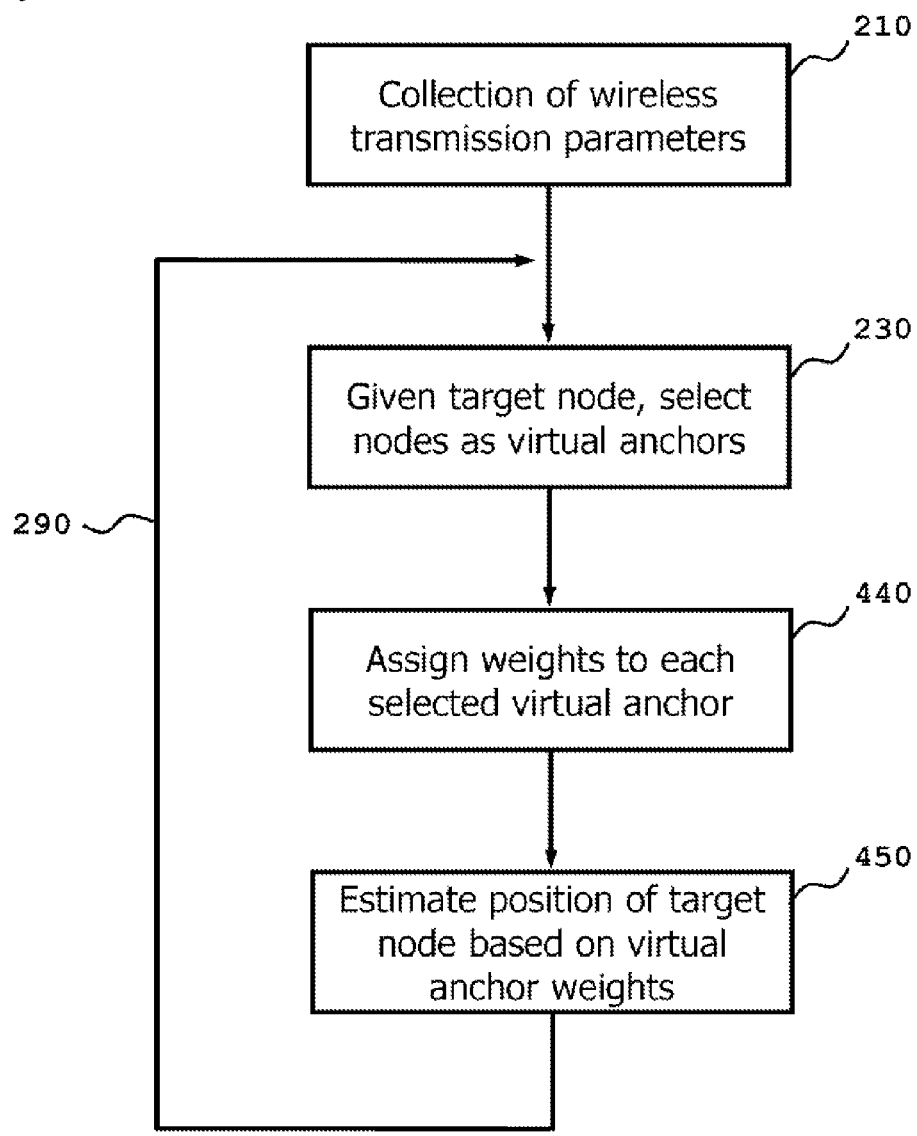
FIG. 4C shows the flowchart illustrating the basic method of determining the positions of wireless terminals with a refined position estimation step according to a preferred embodiment of the present invention.

We can generalize the above weighted estimation approach to the one illustrated in FIG. 4C. Here, in the wireless transmission parameters collection step 210, parameters of the wireless communications are collected from fixed nodes and mobile nodes. This followed by the start of the iteration loop 290 with the virtual anchor selection step 230 where given a target node whose position is to be estimated, a set of mobile nodes is selected to act as virtual anchors. In step 440, a weight is assigned to each selected virtual anchor. This set of weights is used in the position estimation step 450 where the position of the target mobile node is estimated based on the parameters collected in step 210 associated with the wireless transmission involving the target mobile node and the selected set of virtual anchors. As described previously, the weights are used in such a way that factors associated with a virtual anchor contributing to the position estimation (such as a portion of a RSSI fingerprint) are multiplied by the weights assigned to the said virtual anchors. The weights can be assigned based on the reliability of virtual anchor. The weights may also be assigned based on the observed parameters of wireless transmission. This may be done using statistical approach such as extended Kalman filter or Bayesian classifier. This may also be done using a trained neural network that takes in the RSSI values in the input layer, and has an output layer where each output perceptron gives the weights associated to each virtual anchor.

In the above description, the position estimation step 260 is often described as using the MMSE algorithm on the fingerprint map. It should be appreciated that other methods can be used as well. For instance, the MMSE is actually a special case of the algorithm known as the k Nearest Neighbor (kNN) where k=1. In the general case, the kNN algorithm is to select multiple candidate positions with the least mean square errors, and give the final estimate as the average of these multiple candidate positions. For example, if k=3, then the positions with the least, second least and third least mean square errors are selected as candidate positions. The average of these three positions then yields the final estimated position. Hence, the position estimation step 260 can actually be implemented with a kNN algorithm. More specifically, the position estimation step 260 may include the steps of, for example, obtaining a plurality of intermediate position estimates using the parameters of wireless transmissions associated with the selected virtual anchors and the target node; assigning a score to each of the plurality of intermediate position estimates based on some predetermined criteria; selecting a number of intermediate position estimates from the said plurality of intermediate position estimates such that the selected intermediate position estimates are those with the lowest scores; and estimating the position of the target node by averaging the said selected intermediate position estimates. We note that the kNN algorithm is essentially trying to identify the local minima points along the mean square error curve and to take the average of these minimal points as the estimated position. The value of k has to be selected carefully. Too large a value of k and the kNN algorithm will erroneously pull in points that are not local minima points on the mean square error curve. Too small a value of k and the kNN algorithm will fail to consider legitimate local minima points, resulting in the estimate being more vulnerable to the effects of noise. The value of k can be preset to a specific value, or it can be dynamically determined based on current situation. The system may use a single value of k for the position estimations of all the mobile nodes, or each mobile node may have a different value of k associated that is determined individually.

For example, the value of k may depend on the number of virtual anchors being selected for the position estimation of a target node. We note that the addition of a virtual anchor introduces an additional component to the calculation of the mean square error. Hence, it is likely for the addition of a virtual anchor to cause additional local minima points along the mean square error curve. This suggests that the value of k may be determined proportionally based on the number of virtual anchors selected. A high number of virtual anchors would mean a high value of k, and conversely, a low number of virtual anchors would mean a low value of k. Alternatively, the value of k may be determined based on the magnitude of changes in the position estimates of the target node. A large amount of change suggests that the estimates are noisy, and a larger value of k may be used to reduce the effect of noise. Conversely, a small amount of change suggests that the estimates are stabilizing, and a smaller value of k may be used to reduce the processing load and chances of adding in points that are not local minima. Yet another approach may be to have different values of k depending on the variances of the observed RSSI collected from the target node, and/or the selected virtual anchors. If the variance is large, this implies that there is significant amount of wireless transmission noise, then the value of k may be reduced to avoid including unreliable points.

When a single value of k is used for all the target nodes, the value of k may be determined similarly based on the average number of virtual anchors selected for the previous iteration (a large number of virtual anchors implies a larger value of k), or based on the total changes in position estimates of all mobile nodes (a significant amount of total changes in position estimates of all mobile nodes implies a bigger value of k). Alternatively, statistical method, such as using a linear filter or neural network trained to obtain the value of k given the observed wireless transmission parameters and number of virtual anchors selected, may be used. Further, recall that we can use the estimated and actual positions of permanent virtual anchors as an indication of how noisy the system is. When the system is noisy, a larger value of k may be used to reduce the effect of noise.

From the above description, we see that based on the virtual anchor selection criteria, it is possible that only a subset of mobile nodes may be selected to be the virtual anchors for a target mobile node. This implies that for some deployment scenario, not all the parameters of wireless transmissions from all the fixed and mobile nodes in the area of detection are needed. For example, in the scenario of detecting the position of passenger carrying a wireless communications capable device (such as mobile phone, Radio Frequency identification tagged train tickets), it is possible that a passenger boards a cabin at an intermediate station such that the positions of existing passengers are already known by the system through prior position estimation. In this case, the new passenger's device is the only target mobile node whose position needs to be estimated. The server can then estimate the set of mobile nodes that can be potential virtual anchors and only collect wireless transmission parameters from this set of mobile nodes. This is illustrated in the flowchart depicted in FIG. 5.

Here, the wireless transmission parameters collection step 210 further comprises the nodes determination step 510 and the reduced parameters collection step 520. In step 510, the server determines the set of nodes to collect parameters of wireless transmissions from, and collect parameters from these determined set of nodes in step 520. How the server can determine the set of nodes may be varied. For example, in the train scenario, the server may be communicating with another position estimation system on the station platform, and can thus estimate the cabin which the new passenger boards. Then the server can determine the set of nodes by choosing only those mobile nodes and fixed nodes that are in the said cabin. Alternatively, the server may determine the set of nodes based on previous estimates, or parameters of wireless transmissions collected from previous collection cycle.

In addition to determining the number of virtual anchors and the selection of virtual anchors, there are other operating parameters that the server can adjust based on the operating environment and conditions. For instance, the interval at which wireless transmission parameters are collected and the power of wireless transmission can be either increased or decreased based on several factors. The interval at which wireless parameters are collected would allow nodes to determine the frequency at which beacon messages or dummy messages are transmitted. The dummy message has a purpose of having a wireless transmission for other nodes to observe. The use of dummy messages is useful in case where ad-hoc mode is employed. Since in ad-hoc mode, only one node is transmitting beacons, the other nodes would need to send dummy messages in order to allow other nodes to observe. Dummy messages are also useful in the case of infrastructure mode if some mobile clients have the capability of monitoring the wireless transmission of other mobile nodes, even though the transmission is intended for the access points. This way, if mobile nodes are transmitting dummy messages, they act like beacons which can be observed by other mobile nodes with monitoring capability. In general, the frequency of transmitting beacon or dummy messages would be set to be the same as the frequency of wireless transmission parameter collection. This is assumed in the descriptions hereafter, although a person skilled in the art would appreciate that an implementation may also set the frequency of transmitting beacon or dummy messages to be at a pre-specified multiples of the frequency of collection of wireless transmission parameters (such as twice).

In one preferred form, the interval of wireless transmission parameters can be adjusted based on the sum of position changes of all nodes. If the sum of position changes between intervals is small, the interval period can be lengthened. This is because a small sum of position changes indicates that there is not much mobility in the nodes, hence there is no need to perform frequent position estimates. This will save the node power consumption. When there is a significant portion of nodes are permanent virtual anchors, the frequency of collection of wireless transmission parameters can also be reduced (i.e. lengthen the interval period between collection of wireless transmission parameters). This is because the positions of permanent virtual anchors are already known, thus they would increase the accuracy of position estimate. Hence, the need for more frequent wireless transmission parameters collection to improve the accuracy of position estimation through statistical improvement over time is not necessary. This will also save the node power consumption. Recall that we can use the estimated and actual positions of permanent virtual anchors as an indication of how noisy the system is. When the system not very noisy, the frequency of collection of wireless transmission parameters can also be reduced since we do not need to perform more estimates to overcome noise, and can instead afford to save the node power consumption with reduced transmissions. On the other hand, if the sum of position changes between intervals is large, the interval period can be shortened. This is because a large sum of position changes indicates that there is much mobility in the nodes, hence more frequent position estimates is required and achieved. Similarly, when very small portion of nodes are permanent virtual anchors, or when the system is noisy (as determined by comparing the estimated and known positions of permanent virtual anchors), the frequency of collection of wireless transmission parameters can also be increased (i.e. shorten the interval period between collection of wireless transmission parameters). This is because with very few nodes whose positions are already known, or when the system is noisy, more frequent wireless transmission parameters collection will be needed to improve the accuracy of position estimation through statistical improvement over time.

In another preferred form, the interval of wireless transmission parameters collection can be different for different types of node (i.e. each node has a different interval). Here, a node's interval of wireless transmission parameters collection can be adjusted based on different factors associated with the node. One factor may be the movement pattern of the node (based on past position estimates). If the node is not moving or moving slowly, then its wireless transmission parameters collection interval can be longer. This will save power consumption appropriately per node. Conversely, when the node is moving rapidly, its interval can be shorter to enable better tracking. Here, the speed used to determine the node's interval can be based on its absolute speed, relative to the total movement pattern of all the nodes or nearby nodes, or user's input regarding user status, e.g. "now moving", "now on a stop", "now on seat", "walking", "running", etc. via user interface on the node. Another factor may be the type of node. If the node is a permanent virtual anchor, then its wireless transmission parameters collection interval can be longer. This is because its position is already known. Yet another factor may be the power source of the node. Most of the nodes are battery powered. However, permanent virtual anchors might be externally powered (e.g. plugged in to the mains). For such externally powered nodes, their wireless transmission parameters collection interval can be much shorter than those that are battery powered, since power consumption level is less of a concern for such nodes. In this case, with increase in transmission from nodes that do not have issue with power consumption, there will be more transmission parameters collected, and this can improve the accuracy of position estimation. A further factor is the position of the node. If the node is in an area where the required position estimation accuracy is higher, then the wireless transmission parameters collection interval for that node may be shorter to allow for more wireless transmission parameters collection. For instance, in a shopping center deployment, areas with a higher shop density would require a higher accuracy level in position estimation compared to area with a lower shop density.

In yet another preferred form, the interval of wireless transmission parameters collection can be first adjusted by the server based on information from all the nodes. Each node then makes additional adjustment based on its own information, such as its own type, movement pattern, or information from the node's own hardware (e.g. acceleration sensor).

In a further preferred form, the interval of wireless transmission parameters collection can be adjusted when one or more new access points or virtual anchors are detected or missing. This would be on a scenario where a train containing access point or virtual anchor gets into a platform, in which case the access points or virtual anchors in the train and also in platform would detect each other as new access points or virtual anchors, so that they would increase frequency of exchange of the parameters with the new access point or new virtual anchor to get higher estimation accuracy. They may start to increase the frequency when their speed becomes slower or faster than pre-configured value, which would mean the train is arriving to or departing from a station (i.e. approaching to or leaving from the platform). This would be helpful because the positioning devices in train could know the time when they start to detect and exchange more with other access points and/or virtual anchors, and then it would get higher estimation accuracy and also save battery consumption without inefficient exchange before getting into the platform. Additionally, the devices may reduce the frequency of exchange when their speed got zero (i.e. the train or the devices are completely or almost stopped), so that battery consumption can be reduced as well.

In one preferred form, the power of wireless transmission can be adjusted based on the sum of position changes of all nodes. If the sum of position changes between intervals is small, the power of transmission can be reduced. This is because a small sum of position changes indicates that there is no much mobility in the nodes, hence there is no need for many virtual anchors to be selected for a given target node. Therefore, transmission power and number of messages exchanged can be reduced as there is no need for transmission from a node to be received by as many nodes. This will save the node power consumption and also avoid possible overload due to exchanging many messages. When there is a significant portion of nodes are permanent virtual anchors, the power of wireless transmission can also be reduced. This is because the positions of permanent virtual anchors are already known, thus they would increase the accuracy of position estimate. Hence, there is no need for wireless transmission of a node to be received by as many nodes.

In another preferred form, the power of wireless transmission can be different for different types of node (i.e. each node has a different transmission power). Here, a node's transmission power can be adjusted based on different factors associated with the node. One factor may be the movement pattern of the node (this can be derived based on past position estimates of the node, or based on information from the node's hardware such as an acceleration sensor). If the node is not moving or moving slowly, then its wireless transmission power can be smaller. This is because there is less need for other nodes to receive its transmission for improving the nodes position estimate. Conversely, when the node is moving rapidly, its transmission power can be increased to enable better tracking. Here, the speed used to determine the node's interval can be based on its absolute speed, or relative to the total movement pattern of all the nodes or nearby nodes. Another factor may be the type of node. If the node is a permanent virtual anchor, then its wireless transmission power can be reduced. This is because its position is already known. Yet another factor may be the power source of the node. Most of the nodes are battery powered. For such battery powered nodes, their wireless transmission power can be reduced to conserve battery. A further factor is the position of the node. If the node is in an area where the required position estimation accuracy is higher, then the wireless transmission power for that node may be increased to have more nodes receiving its transmission.

In yet another preferred form, the power of wireless transmission parameters collection can be adjusted by the server based on information from all the nodes. Each node then makes additional adjustment based on its own information, such as its own type, movement pattern, or information from the node's own hardware (e.g. acceleration sensor).

In the description of the above preferred embodiments, it is illustrated that the server performs the main process of position estimation of the mobile nodes. This is a centralized process model where the mobile nodes are involved only in transmitting their observed parameters of the wireless transmission (such as the RSSI). There can be varying degrees of centralized to completely distributed process, which will be described in the following preferred embodiments.

Figure 6:
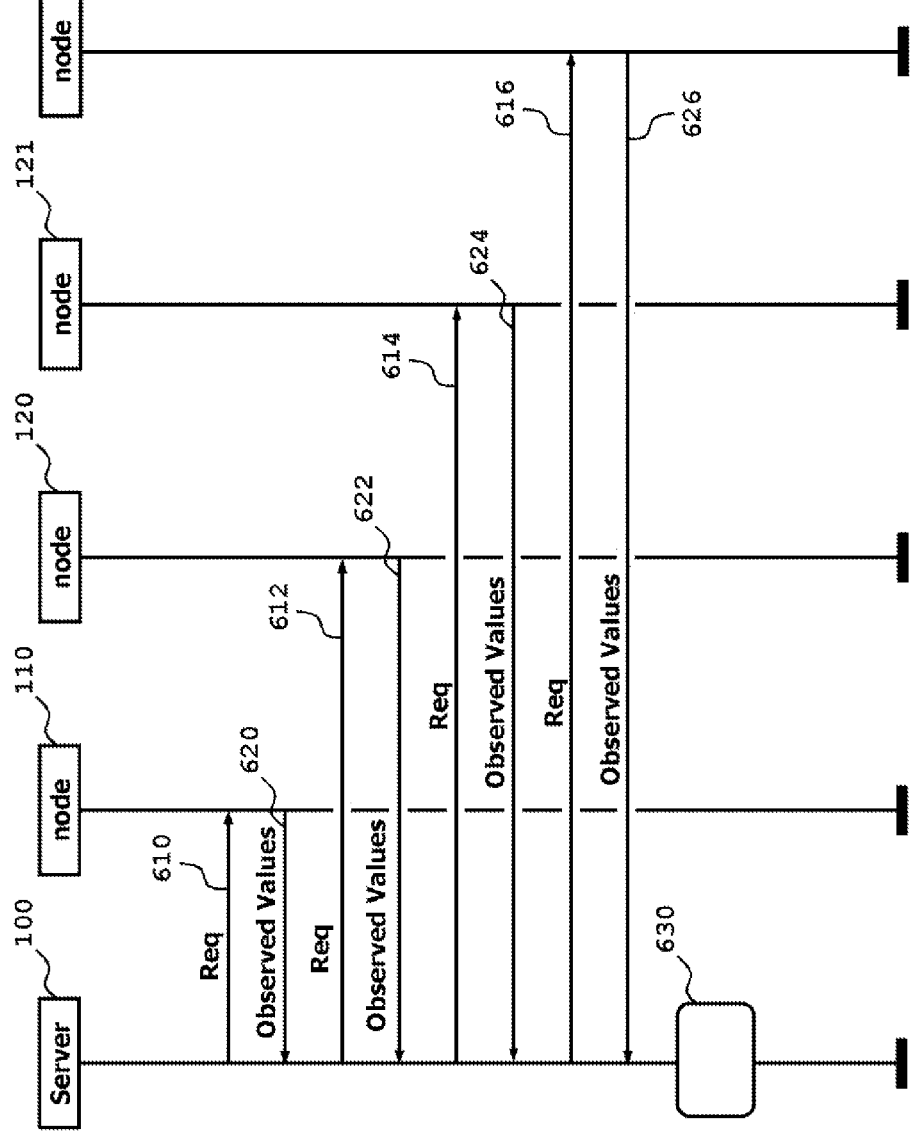
FIG. 6 illustrates a message sequence diagram of the message exchanged between server and nodes according to a centralized processing model described in a preferred embodiment of the present invention.

FIG. 6 shows the message sequence diagram of a centralized process model. Here, the server will collect the observed parameters of wireless transmissions from the fixed nodes and mobile nodes, and perform the virtual anchor selection and position estimation steps. This is useful when there is a powerful sever available, and the power consumption for the mobile nodes are to be kept minimal. The server begins by requesting for observed parameters from the fixed and mobile nodes by sending request messages 610, 612, 614 and 616. Each request message may contain description of what kind of parameters the server needs. For example, when the system needs only to estimate the position of a single target mobile node, the request message may indicate that only parameters related to wireless transmission associated with the target mobile node are required. In the centralized processing model, the server will make the decisions on how to adjust the operating parameters (such as frequency of transmissions of wireless parameters and transmission power). As described earlier, the server can make the decision for all the nodes, but different values for the same parameter may be used for different node. Accordingly, the request message will contain the current operating parameters for the receiving node, such as the power of wireless transmission to use, and/or the frequency of wireless transmission parameters collection (which is linked to the frequency of beacon/dummy message transmission). In FIG. 6, it is illustrated that these request messages are transmitted separately and addressed directly to each node 110, 120, 121 and 122. A person skilled in the art would appreciate that the server can also send a broadcast message that would be received by all nodes. In this case, the request messages 610, 612, 614 and 616 are actually a single message. Note that "broadcast" in this sense is used from a network layer perspective. Since the server may not be a wireless communications enabled node, the actual message would typically need to be sent to the wireless access point, which will then be broadcasted to the wireless communication nodes. Even when the server is a wireless communications node, a "broadcast" message would still be sent to the access point first, which would then broadcast the message to other nodes, in the case of infrastructure (or known as the extended service set in the case of IEEE802.11) mode of wireless communications. Only in the ad-hoc (or known as the independent basic service set in the case of IEEE802.11) mode, the message is truly broadcasted to other mobile nodes wirelessly, i.e. over layer 2 logical link or layer 1 physical link.

Figure 5:
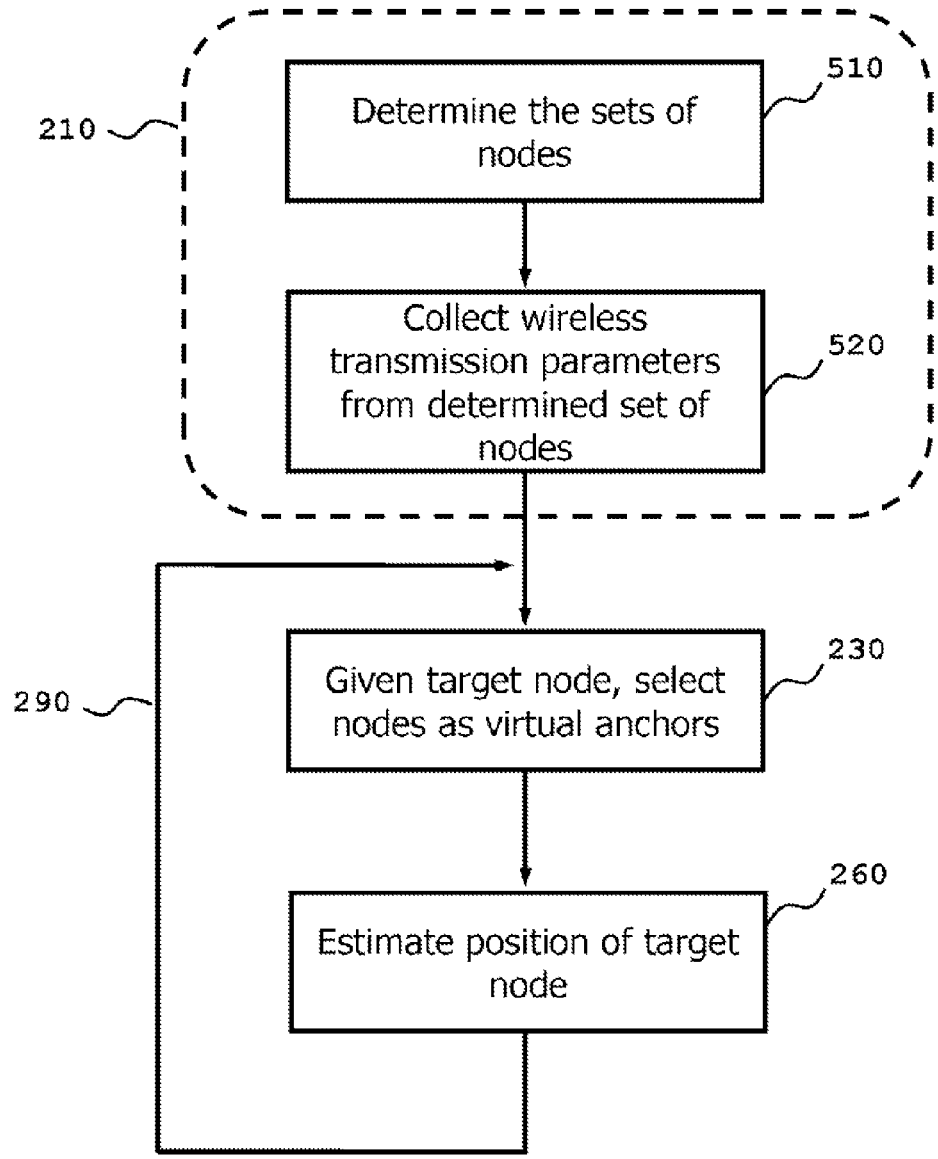
FIG. 5 shows the flowchart illustrating the basic method of determining the positions of wireless terminals with a refined wireless transmission parameters collection step according to a preferred embodiment of the present invention.

Sending a broadcast message has the advantage of saving the wireless bandwidth, while sending individual unicast messages allows the server to send request message to only a subset of nodes (for example, the step 510 in FIG. 5 determines that only wireless transmission parameters of a subset mobile nodes are needed). In both cases, when each of fixed and mobile nodes receives the request message, it will transmit its most recent set of observed parameters to the server. This is shown in FIG. 6 as the messages 620, 622, 624 and 626. Once the server has collected the observed parameters, it can perform the estimation process 630 with the virtual anchors selection and position estimation steps.

A person skilled in the art would appreciate that although a request message is shown to be sent by the server to the fixed and mobile nodes in FIG. 6, it is possible for the parameters collection process to be done in a synchronous manner. For example, each of the fixed and mobile nodes may be configured to send the most recent set of observed parameters to the server periodically without the need for the server to prompt them with request messages.

Figure 9:
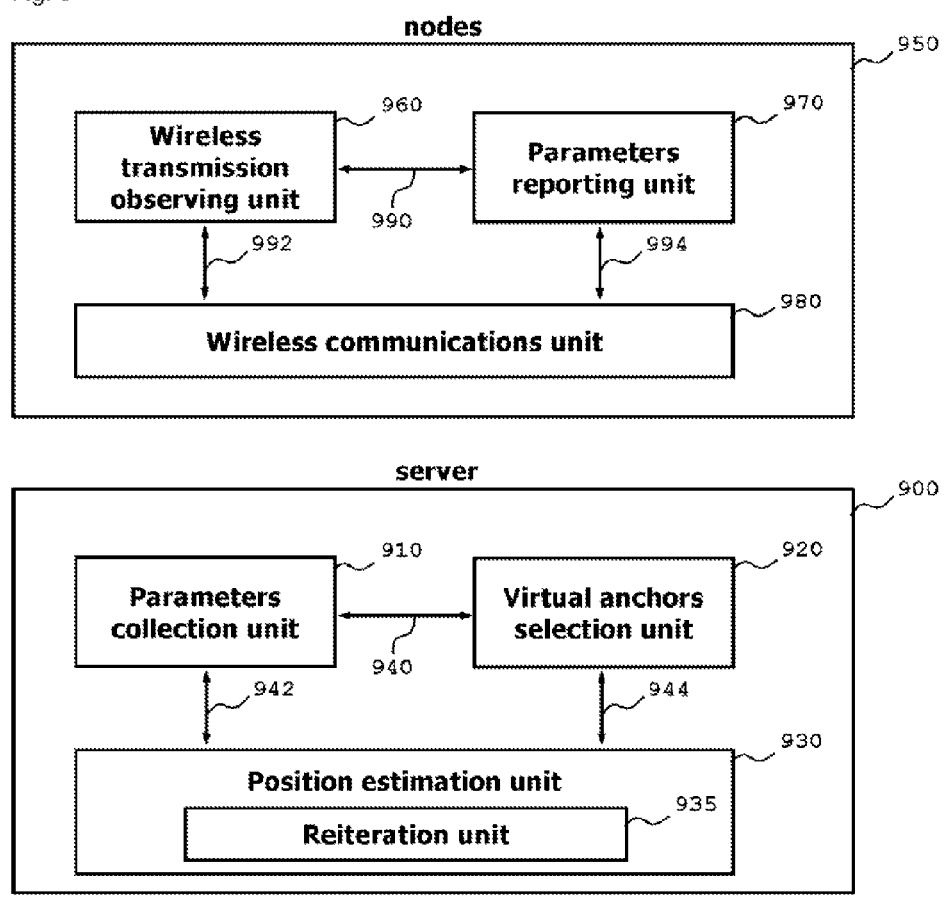
FIG. 9 depicts the functional architectures of the server and nodes according to a centralized processing model described in a preferred embodiment of the present invention.

FIG. 9 shows the preferred functional architecture 900 of the server and the preferred functional architecture 950 of the fixed/mobile nodes according to the centralized process model. The functional architecture 900 of the server comprises the parameters collection unit 910, the virtual anchors selection unit 920, and the position estimation unit 930. The parameters collection unit 910 collects and stores the observed parameters (such as RSSI values) of the wireless transmission from the fixed and mobile nodes. These values may then be fetched through the signal paths 940 and 942 by the virtual anchors selection unit 920 and position estimation unit 930. The virtual anchors selection unit 920 selects, given a target mobile node, the set of nodes to act as virtual anchors. The selection method may be any one of the methods previously described. If a plurality of methods are implemented, the virtual anchors selection unit 920 also chooses the appropriate selection criteria. The set of selected virtual anchors is fetched by the position estimation unit 930 through the signal path 944. The position estimation unit 930 makes use of the observed parameters and the set of selected virtual anchors to estimate the position of a specified target node. It may use any one the estimation methods previously described. There is also a reiteration unit 935 which will reiterate the virtual anchor selection and position estimation processes until there are no significant changes in the estimated positions, or until a maximum number of iteration has been exceeded.

The functional architecture 950 of the fixed/mobile node comprises a wireless transmission observing unit 960, a parameters reporting unit 970 and a wireless communications unit 980. The wireless communications unit 980 represents the hardware circuitry, firmware drivers, and software protocol stacks that are necessary for the node to communicate wirelessly. Using signal path 992, the wireless transmission observing unit 960 may extract parameters of wireless transmission from the wireless communications unit 980. The parameters extracted by the wireless transmission observing unit 960 may include the RSSI of received transmission from another station or access point. These parameters can be passed to the parameters reporting unit 970 through the signal path 990. The parameters reporting unit 970 sends reports containing the observed parameters of wireless transmission to the server. As described previously, this can be done in response to receiving a request message from the server, or be triggered through a periodic or dynamic timer. The dynamic timer may be controlled by messages sent from the server. The signal path 994 allows the parameters reporting unit 970 to transmit the report through the wireless communications unit 980.

Figure 7:
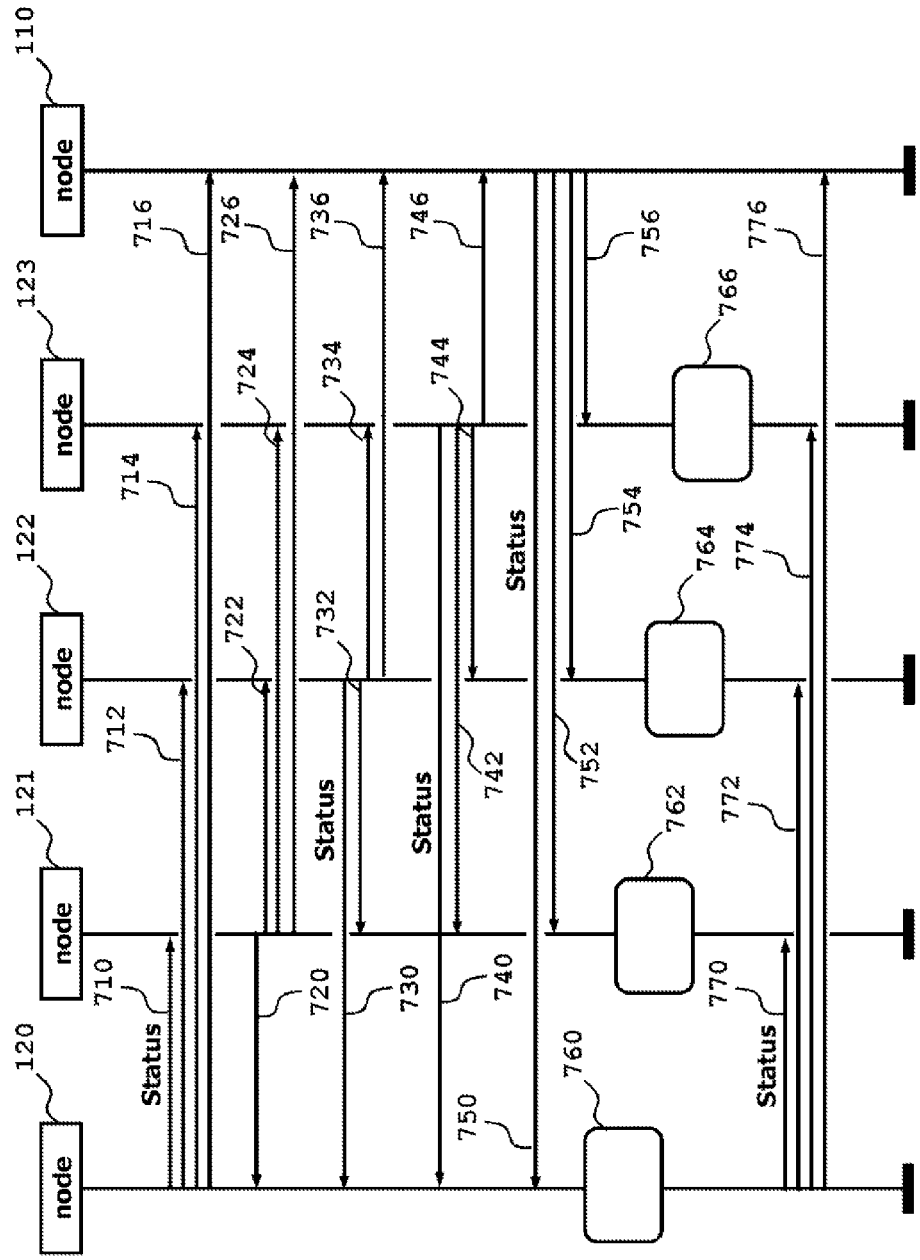
FIG. 7 illustrates a message sequence diagram of the message exchanged between nodes according to a decentralized processing model described in a preferred embodiment of the present invention.

The above describes a centralized processing model where a server is deployed in the system and the main bulk of processing for position estimation is carried out on the server. FIG. 7, on the other hand, illustrates the message sequence diagram for the system where a decentralized processing model is deployed. Here, there is no server performing the position estimation, and all the steps from parameters collection, to virtual anchor selection, to position estimation are carried out by the fixed/mobile nodes. Here, each node would periodically broadcast their status with the status messages 710, 712, 714, 716, 720, 722, 724, 726, 730, 732, 734, 736, 740, 742, 744, 746, 750, 752, 754, and 756. The interval between the broadcast can be preconfigured and/or dynamically determined based on the node movement, node types, etc. as described previously. Each status message may contain the current (estimated) position of the sending node, and the parameters of wireless transmissions observed by the sending node. In the decentralized processing model, each node will also make the decisions on how to adjust the operating parameters (such as frequency of transmissions of wireless parameters and transmission power) for itself. As described earlier, the node can make the decision based on collected information from all the nodes, and/or based on information from the node itself (such as information from the node's hardware, e.g. acceleration sensor). Such decided values of the operating parameters of the sending node can also be included in the status message. In FIG. 7, it is illustrated that these status messages are transmitted separately and addressed directly to each node 110, 120, 121, 122 and 123. A person skilled in the art would appreciate that the nodes can also send a broadcast message that would be received by all nodes. In this case, for example, the status messages 710, 712, 714 and 716 sent by node 120 are actually a single message. Note that "broadcast" in this sense is used from a network layer perspective, as described previously. For the case where only a subset of mobile nodes need to estimate their positions, the status messages sent by the mobile nodes which need to estimate their positions would contain the request for parameters of wireless transmission. Other mobile nodes that receive the status message with request can respond with their own status messages. But these responses are only sent to the sender of the request and not to all the mobile nodes.

Once a mobile node receives status messages from other nodes, it can start the virtual anchors selection and position estimation steps based on the collected parameters of wireless transmission obtained from the status messages to estimate its own position. This is shown in FIG. 7 as processes 760 for node 120, process 762 for node 121, process 764 for node 122, and process 766 for node 123. Fixed nodes such as node 110 do not need to perform these steps. After this, the node can broadcast its status again after a pre-specified timeout for periodic status message exchange, or if the estimated position changes significantly. For example, if node 120 finds its position estimate from process 760 changes significant from the position it has broadcasted in the status message 710/712/714/716, node 120 can broadcast another status message 770/772/774/776.

Figure 10:
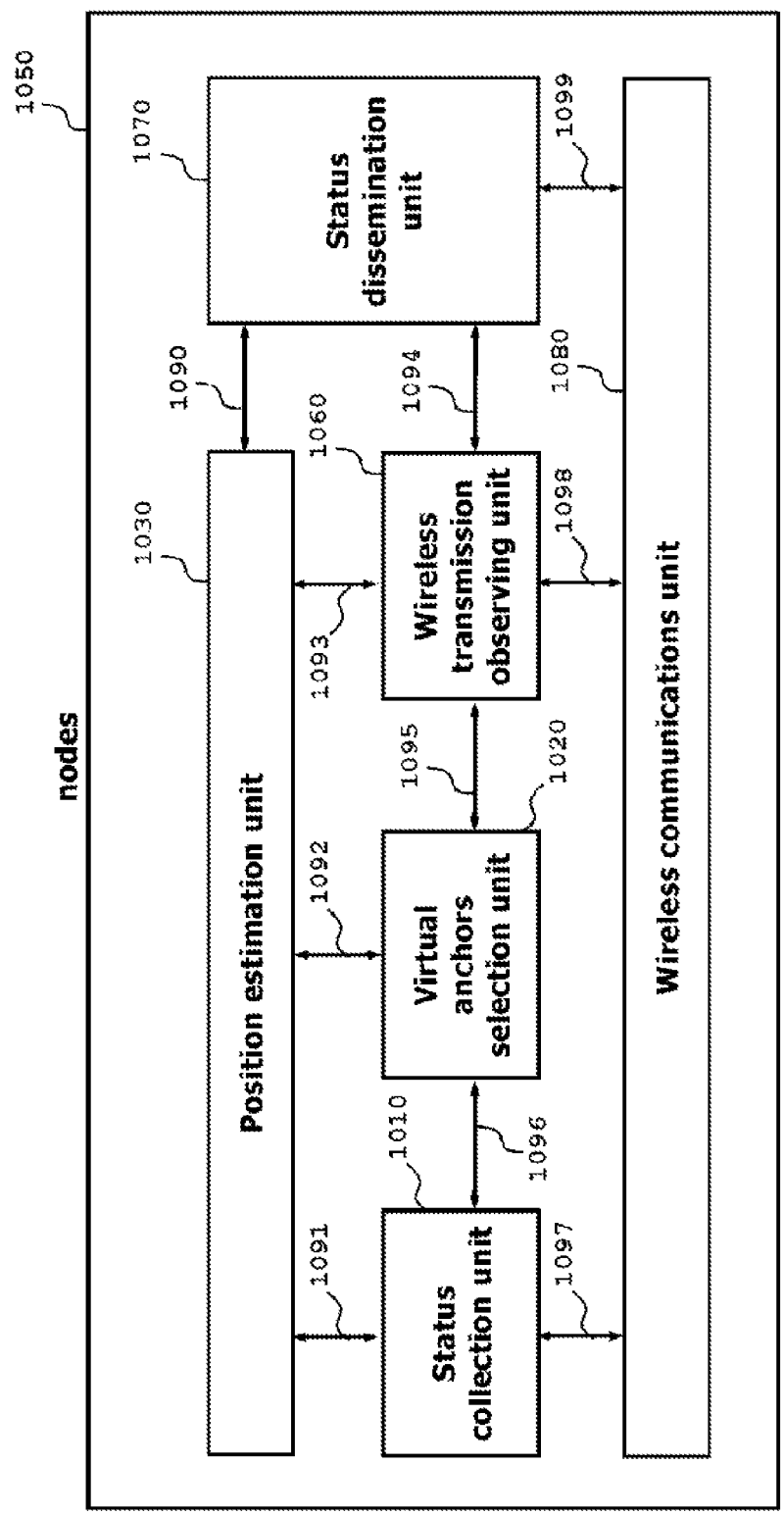
FIG. 10 depicts the functional architecture of the nodes according to a decentralized processing model described in a preferred embodiment of the present invention.

FIG. 10 shows the preferred functional architecture 1050 of the mobile nodes according to the decentralized process model. The functional architecture 1050 comprises the status collection unit 1010, the virtual anchors selection unit 1020, the wireless transmission observing unit 1060, the position estimation unit 1030, the status dissemination unit 1070 and the wireless communications unit 1080. The wireless communications unit 1080 represents the hardware circuitry, firmware drivers, and software protocol stacks that are necessary for the node to communicate wirelessly. Using signal path 1098, the wireless transmission observing unit 1060 may extract parameters of wireless transmission from the wireless communications unit 1080. The parameters extracted by the wireless transmission observing unit 1060 may include the RSSI of received transmission from another station or access point. These parameters can be passed to the virtual anchors selection unit 1020 through the signal path 1095, and to the position estimation unit 1030 through signal path 1093. The status collection unit 1010 collects and stores the observed parameters (such as RSSI values) of the wireless transmission and positions of other nodes extracted from the status messages received from other nodes. The received status messages are passed from the wireless communications unit 1080 via signal path 1097. These extracted values may then be fetched through the signal paths 1096 and 1091 by the virtual anchors selection unit 1020 and position estimation unit 1030. The virtual anchors selection unit 1020 selects the set of nodes to act as virtual anchors for the estimation of its position based on the parameters observed by the wireless transmission observing unit 1060 and the extracted information from the status collection unit 1010. The selection method may be any one of the methods previously described. If a plurality of methods are implemented, the virtual anchors selection unit 1020 also chooses the appropriate selection criteria. The set of selected virtual anchors is used by the position estimation unit 1030 through the signal path 1092. The position estimation unit 1030 makes use of the observed parameters and the set of selected virtual anchors to estimate the position of a specified target node. It may use any one the estimation methods previously described. For example, the expected RSSI fingerprint map is generated using (Eq. 1), and then the position can be estimated by finding the MMSE. The estimated position can be passed to the status dissemination unit 1070 through signal path 1090. The status dissemination unit 1070 sends status message containing the observed parameters of wireless transmission (retrieved from the wireless transmission observing unit 1060 via signal path 1094) and the currently estimated position to other nodes. As described previously, this can be done in response to receiving a status message with request, when there is significant change in the estimated position, or be triggered through a periodic static or dynamic timer. The signal path 1099 allows the status dissemination unit 1070 to transmit the status message through the wireless communications unit 1080.

The above describes a centralized processing model and a decentralized processing model. It is possible to have something in between where a server is deployed to aid the selection of virtual anchors, while position estimation is carried out by nodes themselves. This semi-centralized processing model retains the benefit of having a distributed processing to speed up the position estimation (compared to the centralized model where position estimation can be very intensive when there are a lot of mobile nodes whose positions need to be estimated) while reducing the number of messages that needs to be transmitted between nodes (compared to the decentralized model).

Figure 8:
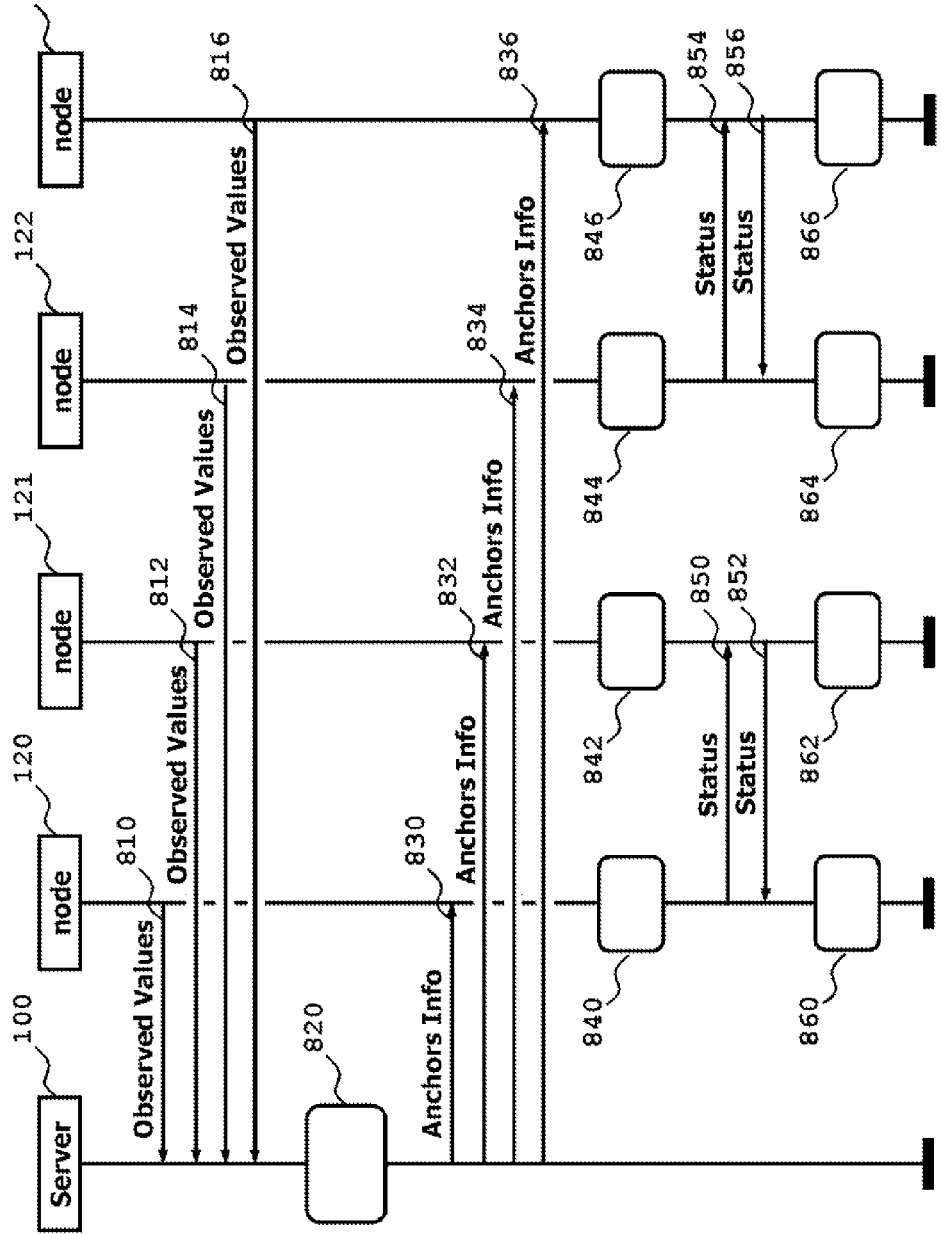
FIG. 8 illustrates a message sequence diagram of the message exchanged between server and nodes according to a semi-centralized processing model described in a preferred embodiment of the present invention.

FIG. 8 illustrates the message sequence diagram of the system where a semi-centralized processing model is deployed. Here, the nodes will report their observed parameters of wireless transmission and their previously estimated position (if any) to the server via messages 810, 812, 814 and 816. This may be triggered periodically, or in response to a report request message sent by the server. Once the server collected the observed parameters, it can then begin the virtual anchors selection step, as shown in FIG. 8 as process 820. As explained in earlier embodiments, each target mobile node would have its own set of virtual anchors. The server will inform each target mobile node which other nodes are their virtual anchors with the anchor info messages 830, 832, 834 and 836. In each of the anchor info messages, the server will specify which nodes are acting as the virtual anchors for the recipient nodes, and also include the estimated position and observed parameters of wireless transmission associated with the specified virtual anchors. The server will also inform the recipient node that it is acting as virtual anchor for which other mobile nodes in the anchors info message. It is possible that the virtual anchor selection algorithm is such that when a first node is acting as virtual anchor for a second node, then the second node will also act as virtual anchor for the first node. In this case, simply specifying the set of mobile nodes that are acting as virtual anchors for the recipient node in the anchors info message is sufficient to let the recipient node know that it is also acting as the virtual anchor for the same set of mobile nodes. The anchor info message may also contain the current operating parameters for the nodes, such as the power of wireless transmission to use, and the frequency of wireless transmission parameters collection (which is linked to the frequency of beacon/dummy message transmission). As described in previous embodiments, these values may be adjusted by the server based on collected information from all the nodes (such as observed RSSI values) or based on past estimation parameters (such as number of virtual anchors selected, the indications of system noise, etc.). The receiving node may make additional adjustment to the values of the operating parameters based on information from the node itself (such as information from the node's hardware, e.g. acceleration sensor). For example, if the receiving node is not moving (e.g. based on information from its accelerometer hardware), it may adjust the frequency of wireless transmission parameters collection to a lower value to reduce power consumption. On the other hand, if it is moving rapidly, it may adjust the frequency of wireless transmission parameters collection to a higher value in order to improve and adapt the estimated positions.

The information included in the anchor info message will allow the recipient node to start the position estimation step, as indicated in FIG. 8 as process 840 for node 120, process 842 for node 121, process 844 for node 122 and process 846 for node 123. When the position estimated is significantly different from their previous position estimate, the mobile node may transmit status messages to other mobile nodes for refinement of position estimates. In this semi-centralized model, the mobile node need only send the status message to those nodes that needs to make use of the sender's position. This typically means those mobile nodes of whom the sender is acting as a virtual anchor. In example of FIG. 8, node 120 sends status message 850 only to node 121, node 121 sends status message 852 only to node 120, node 122 sends status message 854 only to node 123, and node 123 sends status message 856 only to node 122. Once the mobile nodes receive the updated position estimates from their virtual anchors, they can repeat the position estimation step. This is shown in FIG. 8 as process 860 for node 120, process 862 for node 121, process 864 for node 122 and process 866 for node 123.

It is also possible to change virtual anchors for mobile nodes, for example, when server detects virtual anchor movement, radio condition change between virtual anchor and target node, etc. In this case, anchors info is updated to target node.

Figure 11:
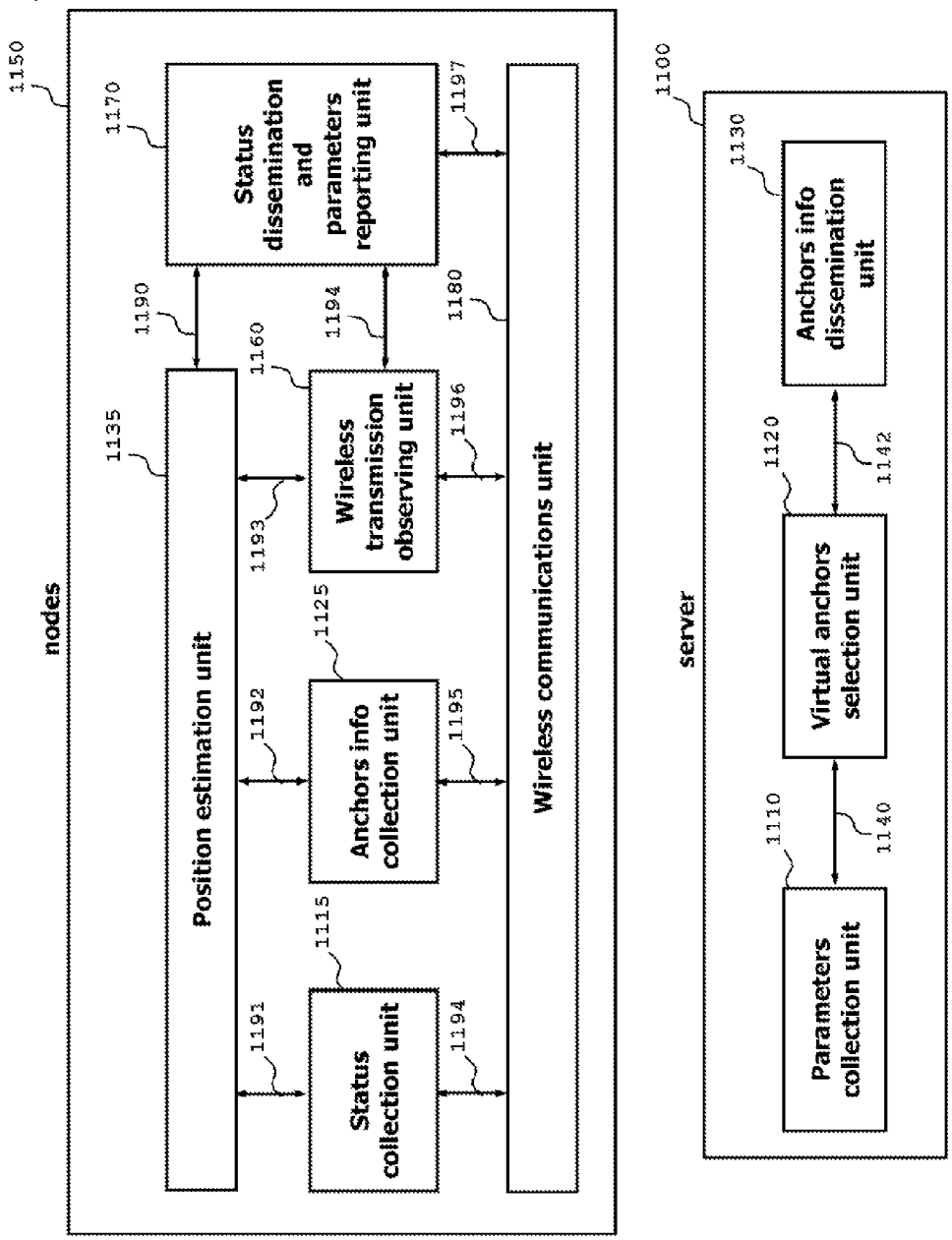
FIG. 11 depicts the functional architectures of the server and nodes according to a semi-centralized processing model described in a preferred embodiment of the present invention.

FIG. 11 shows the preferred functional architecture 1100 of the server and the preferred functional architecture 1150 of the fixed/mobile nodes according to the semi-centralized process model. The functional architecture 1100 of the server comprises the parameters collection unit 110, the virtual anchors selection unit 1120, and the anchors info dissemination unit 1130. The parameters collection unit 1110 collects and stores the observed parameters (such as RSSI values) of the wireless transmission and estimated positions from the fixed and mobile nodes. These values may then be fetched through the signal paths 1140 by the virtual anchors selection unit 1120. The virtual anchors selection unit 1120 selects, for each target mobile node, the set of nodes to act as virtual anchors. The selection method may be any one of the methods previously described. If a plurality of methods are implemented, the virtual anchors selection unit 1120 also chooses the appropriate selection criteria. The set of selected virtual anchors is informed to the anchors info dissemination unit 1130 via signal path 1142. The anchors info dissemination unit 1130 sends anchors info message to each target mobile node containing the set of mobile nodes that are acting as the virtual anchors for the recipient, the estimated position and observed parameters of wireless transmission associated with the specified virtual anchors, and the set of nodes for which the recipient are acting as virtual anchors. It is possible that the virtual anchor selection algorithm is such that when a first node is acting as virtual anchor for a second node, then the second node will also act as virtual anchor for the first node. In this case, simply specifying the set of mobile nodes that are acting as virtual anchors for the recipient in the anchors info message is sufficient to let the recipient know that it is also acting as the virtual anchor for the same set of mobile nodes.

The functional architecture 1150 of the mobile node comprises the status collection unit 1115, the anchors info collection unit 1125, the wireless transmission observing unit 1160, the position estimation unit 1135, the status dissemination and parameters reporting unit 1170 and the wireless communications unit 1180. The wireless communications unit 1180 represents the hardware circuitry, firmware drivers, and software protocol stacks that are necessary for the node to communicate wirelessly. Using signal path 1196, the wireless transmission observing unit 1160 may extract parameters of wireless transmission from the wireless communications unit 1180. The parameters extracted by the wireless transmission observing unit 1160 may include the RSSI of received transmission from another station or access point. These parameters can be passed to the position estimation unit 1135 through signal path 1193, and passed to the status dissemination and parameters reporting unit 1170 through signal path 1194 for reporting to the server. The status collection unit 1115 collects and stores the updated positions of other nodes extracted from the status messages received from other nodes. The received status messages are passed from the wireless communications unit 1180 via signal path 1194. The updated positions may then be fetched through the signal path 1191 by the position estimation unit 1135 for refinement of position estimate. The anchors info collection unit 1125 collects and stores the observed parameters of wireless transmission associated with its virtual anchors extracted from the anchors info messages received from the server. The received anchors info messages are passed from the wireless communications unit 1180 via signal path 1195. The anchors information may then be fetched through the signal path 1192 by the position estimation unit 1135 for position estimation. The position estimation unit 1135 makes use of the observed parameters and the set of selected virtual anchors to estimate the position of a specified target node. It may use any one the estimation methods previously described. The estimated position can be passed to the status dissemination and parameters reporting unit 1170 through signal path 1190 for sending status message to other mobile nodes. The status dissemination and parameters reporting unit 1170 sends status message containing the currently estimated position to other nodes. As described previously, this can be done when there is significant change in the estimated position. The status dissemination and parameters reporting unit 1170 also sends report message containing the observed parameters of wireless transmission (retrieved from the wireless transmission observing unit 1160 via signal path 1194) and the currently estimated position to the server. As described previously, this can be done in response to receiving a request message from the server, or be triggered through a periodic timer. The signal path 1197 allows the status dissemination and parameters reporting unit 1170 to transmit the status or report message through the wireless communications unit 1180.

The above preferred embodiments give different overviews of how the location system can be implemented. Here, we describe a specific implementation using the centralized processing model. In this specific implementation, there are three modes of operation depending on the types of nodes that are present in the system. One type of nodes are those that can operate in both the independent basic service set (IBSS) and extended service set (ESS) modes of IEE802.11 wireless local area network. We refer to such nodes as full client nodes. Another type of nodes are those that can only operate in extended service set mode. We refer to such nodes as the simple client nodes, or just simply client nodes. The full client node can monitor the RSSI of wireless transmission from other full client nodes operating in IBSS mode, in addition to monitoring the RSSI of beacon transmission from access points in IBSS mode. Simple client node can only monitor the RSSI of beacon transmissions. One point to note is that in IBSS mode, beacons are also being transmitted by the mobile stations. Such beacons can also be monitored by simple client node. However, normal transmission of data messages of nodes in IBSS mode cannot be monitored by simple client node. Note also that the IBSS mode is also commonly referred to as ad-hoc mode, and ESS mode is commonly referred to as infrastructure mode.

Depending on the types of nodes that are present in the system, the implementation can operate in three different modes: pure ad-hoc mode, infrastructure-only mode, and hybrid mode. In pure ad-hoc mode, the system consists of only full client nodes. As such, the wireless communications will operate in IBSS mode, and FIG. 12 illustrates the message sequence chart of the pure ad-hoc mode operation. Here, we use the deployment scenario depicted in FIG. 1 as an example, and nodes 120, 121, 122 and 123 are assumed to be full client nodes.

In the beginning, server 100 will read in the configuration as illustrated in FIG. 12 as process 1210. Configuration may be done by loading a file or input from an operator based on the current operating environment. The configuration will set some system parameters such as the initial interval between wireless transmission parameters collection, the type of virtual anchor selection criterion to use (as described previously, there can be multiple selection criteria such as based on proximity, based on a linear set of weights), the initial transmit power to use, the positions and operating parameters e.g. SSID frequency) of known fixed anchors, etc. When each full client node enters the system, they will register with the server 100. This is illustrated by the register messages 1220, 1224, 1228, and 1232 sent by nodes 120, 121, 122 and 123 respectively. Each register message will indicate to the server the capabilities of the sender (such as sender is a full client node), the identification of the sender (such as a human readable name and the medium access control address), and other information associated with the sender (for example, the position of the sender if known, such as for the case the sender is a permanent virtual anchor). In response to each register message, server 100 will update its node database based on the contents of the register message, and send back an information message to the sender of the register message. This is illustrated in FIG. 12 as the info messages 1222, 1226, 1230, and 1234 sent to nodes 120, 121, 122 and 123 respectively. Each info message will contain a unique identification assigned to the recipient by the server, the details of nodes known by the server such as their IP address and unique identification, and a sequence number associated with the node database. This sequence number will be included in all subsequent messages sent by the full client node. This allows the server to compare the sequence number known by the node against its own current sequence number for node database, so that the server knows whether the node has been informed of the most updated information. Each time the node database is updated, the sequence number will be incremented. Hence if the server receives a message containing a sequence number that is different from its current sequence number for node database, the server knows that the sender of the message has an outdated knowledge of the current nodes in the system. The server will then update the sender with a new info message. This is illustrated in FIG. 12 as the messages 1260 and 1262. When reporting the observed values, node 120 also includes its current sequence number into message 1260. Server 100 compares the sequence number included in message 1260 and finds that it differs from the current sequence number of the node database. Hence the server 100 updates node 120 with the info message 1262. The sequence number can also be used as a security measure, so that if the server receives a sequence number that is invalid (e.g. out of normal range), the server will alert the operator.

The info message will inform other operating parameters such as the interval of wireless transmission parameters collection, and the transmission power to use. With the operating parameters known, the full client nodes will know when to send periodic dummy messages (such as the dummy messages 1240, 1242, 1244 sent by node 121 and dummy messages 1250, 1252 and 1254 sent by node 122) and when to report the observed wireless transmission parameters to the server (illustrated in FIG. 12 as the observed values message 1260 sent by node 120 and message 1270 sent by node 123).

The parameters regarding interval of wireless transmission and the transmission power to use can be prepared per client node or virtual anchor point for their configuration, such that the client node or virtual anchor node receives the parameters and then adjusts interval and/or transmission power for dummy messages sent to all of other nodes based on the parameters. The parameters may also contain interval of response and the node received and configured with the parameter can adjust interval to receive, measure RSS or send observed values to the server, e.g. once per 3 receptions of dummy messages.

In other case, the parameters may be prepared per target client node or target virtual anchor point which is target of the dummy messages to be sent from the node (client node or virtual anchor node) which receives the parameters from the server. The node will send dummy messages to each of target with specific interval and/or transmission power based on the configuration in the parameters.

In infrastructure-only mode, the system consists of only simple client nodes. As such, the wireless communications will operate in ESS mode, and FIG. 13 illustrates the message sequence chart of the infrastructure-only mode operation. Here, we use the deployment scenario depicted in FIG. 1 as an example, and nodes 124 and 125 are assumed to be simple client nodes, while nodes 110 and 114 are access points acting as anchor nodes.

At the beginning, server 100 will read in the configuration as illustrated in FIG. 13 as process 1310. Similar to the pure ad-hoc mode case, the configuration will set some system parameters such as the initial interval between wireless transmission parameters collection, the initial transmission power to use, the positions and operating parameters (e.g. SSID, frequency) of known fixed anchors, etc. When each simple client node enters the system, they will register with the server 100. This is illustrated by the register messages 1320 and 1324 sent by nodes 124 and 125 respectively. Each register message will indicate to the server the capabilities of the sender (such as sender is a simple client node), the identification of the sender (such as a human readable name and the medium access control address), and other information associated with the sender (for example, the current transmission power of the sender. Similar to the pure ad-hoc mode case, in response to each register message, server 100 will update its node database based on the contents of the register message, and send back an information message to the sender of the register message. This is illustrated in FIG. 13 as the info messages 1322 and 1326 sent to nodes 124 and 125 respectively. The information contained in each info message is similar to that as described for the pure ad-hoc mode case.

The info message will also contain operating parameters such as the interval of wireless transmission parameters collection. With the operating parameters known, the simple client nodes will know when to start monitoring for beacons sent by anchor nodes (such as the beacons 1350 and 1351 sent by anchor node 110 and beacons 1360 and 1361 sent by anchor node 114) and when to report the observed wireless transmission parameters to the server (illustrated in FIG. 13 as the observed values message 1332 sent by node 124 after the beacon monitoring process 1330 and message 1342 sent by node 125 after the beacon monitoring process 1340). Note that in FIG. 13, although only two beacons are shown to be transmitted from each anchor node, it should be appreciated that an access point would be transmitting beacons frequently (typically in the range of one beacon per 100 ms). If the anchor nodes can be controlled by the server, then the server can actually configure the anchor node in such a way that their beacon transmissions will coincide with the monitoring process of the simple client nodes.

For hybrid mode, the system consists of both full client nodes and simple client nodes. In this case, the wireless communications will operate in ESS mode, while full client node will switch periodically to IBSS mode or have another communication interface to enable IBSS mode to transmit beacons that can be monitored by simple clients. Unlike in pure ad-hoc mode where all the full client nodes will be associating to the same Service Set Identifier (SSID), for hybrid mode, each full client node will be using a unique SSID when operating in IBSS mode. This is because in IBSS mode, only one node per SSID will be transmitting beacons. Here, we want all full client nodes to be transmitting beacons (so that simple client node can monitor the RSSI of the beacons), hence each of them will be using a unique SSID, possibly assigned by the server and provided during information provisioning (FIG. 14, step 1422, 1426, 1430). The assigned SSID may also be provided to simple clients during information provisioning from the server so that the simple clients can be easily identified by the SSIDs to be monitored. This would avoid monitoring overhead thus reduce time for positioning. The SSID provided to the simple client may be arranged based on the area around the anchor point through which the simple client accesses. Further, it is also possible for a full-client to change to a simple client to conserve battery power (since transmitting in IBSS mode will consume more power). FIG. 14 illustrates the message sequence chart of the hybrid mode operation. Here, we use the deployment scenario depicted in FIG. 1 as an example, and nodes 120 and 121 are assumed to be full client node while node 125 is assumed to be simple client node and node 114 is assumed to be an access point acting as an anchor node.

In the beginning, server 100 will read in the configuration as illustrated in FIG. 14 as process 1410. Similar to the pure ad-hoc mode and infrastructure-only mode cases, the configuration file will set some system parameters such as the initial interval between wireless transmission parameters collection, the type of virtual anchor selection criterion to use, etc. When each node enters the system, they will register with the server 100. This is illustrated by the register messages 1420, 1424 and 1428 sent by nodes 120, 121 and 125 respectively. Each register message will indicate to the server the capabilities of the sender (such as sender is a simple client node or a full client node), the identification of the sender (such as a human readable name and the medium access control address), and other information associated with the sender (for example, the position of the sender if known, such as for the case the sender is a permanent virtual anchor). Similar to the pure ad-hoc mode and infrastructure-only mode cases, in response to each register message, server 100 will update its node database based on the contents of the register message, and send back an information message to the sender of the register message. This is illustrated in FIG. 14 as the info messages 1422, 1426 and 1430 sent to nodes 120, 121 and 125 respectively. The information contained in each info message is similar to that as described for the pure ad-hoc mode and infrastructure-only mode cases. The info message will also include the SSIDs to be monitored, which include the SSIDs used by anchor nodes and full client nodes. The message may further include information, in addition to the SSIDs, which indicates type or mode of anchor node (e.g. ad-hoc mode, infrastructure mode) for each SSID, such that clients receiving the information can configure appropriate mode (ad-hoc or infrastructure) to monitor the informed SSIDs.

The info message will also contain other operating parameters such as the interval of wireless transmission parameters collection, and the power of wireless transmission to use. With the operating parameters known, the full client nodes will know when to switch to IBSS mode and/or how long it should keep the mode for beacon transmission (illustrated in FIG. 14 as processes 1440 and 1450 for nodes 120 and 121 respectively), the full and simple client nodes will know when to start monitoring and/or how long it should keep the monitoring for beacons (such as the beacons 1441 and 1442 sent by full client node 120 during IBSS operation in process 1440, the beacons 1451 and 1452 sent by full client node 121 during IBSS operation in process 1450, and beacons 1471, 1472 and 1473 sent by anchor node 114) and when (and/or until when) to report the observed wireless transmission parameters to the server (illustrated in FIG. 14 as the observed values message 1480 sent by node 120 after the beacon monitoring process 1440, the observed values message 1484 sent by node 121 after the beacon monitoring process 1450 and the observed values message 1486 sent by node 125 after the beacon monitoring process 1460). Such that the clients can be managed with appropriate location accuracy and power consumption from client's mobility aspect. For example, the server can indicate less interval for monitoring and report (i.e. frequently monitoring and reporting) to a client with high mobility so that the client can be detected more precisely. In other case, for a client with less mobility or almost fixed (e.g. no mobility for a while because of its stop) in a specific place, the server can indicate more interval (i.e. less frequency) for monitoring and reporting so that the client can reduce its battery consumption.

Note that in FIG. 14, although only two beacons are shown to be transmitted from the anchor node 114, it should be appreciated that an access point would be transmitting beacons frequently (typically in the range of one beacon per 100 ms). If the anchor nodes can be controlled by the server (e.g. the server is a wireless access point controller to control and configure, e.g. frequency, transmission power, antenna angle, etc. on wireless access points which are under its control and connected to the controller via fixed line or another wireless connection), then the server can actually configure the anchor node in such a way that their beacon transmissions will coincide with the monitoring process of the simple and full client nodes. Note also that the beacon monitoring and the IBSS operation of a full client node are performed in the same process.

Figure 15B:
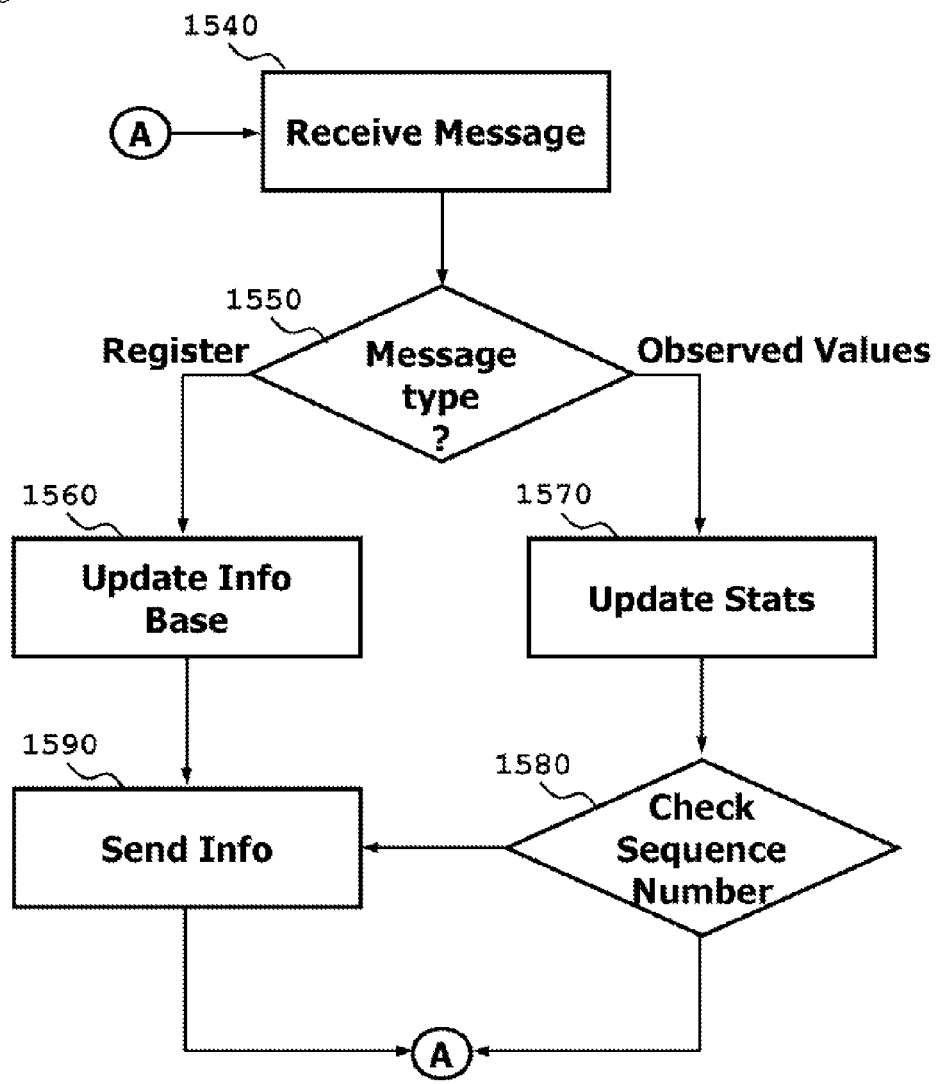
FIG. 15B illustrates the received message processing flowchart for server according to a preferred embodiment of the present invention.

The above implementation is designed in such a way that the operation of server, simple client node and full client node are similar, regardless of which of the three modes the system is operating in. FIG. 15A describes the state machine that governs the behavior of the full/simple client node, while FIG. 15B illustrates the flowchart that governs the processing needed when the server received a message from one of the nodes.

In FIG. 15A, the initial state for the client node is in the UNREGISTERED state S1500. In this UNREGISTERED state, the client has yet to register with the server. After some timeout, the client in this state will attempt to register with the server by sending a register message. If the registration is unsuccessful, the state transition T1502 will be taken which will return to the UNREGISTERED state S1500. On the other hand, if the registration is successful (e.g. the client receives an info message), state transition T1504 will be taken which will bring the client to the REGISTERED state S1510. This is the normal state a registered client will be in. When a timeout expires, state transition T1512 will be taken that will bring the client to the SCANNING state S1520. This timeout interval can be pre-configured or specified by the server in an info message. A simple client in this state will monitor for beacons sent with SSIDs specified by the server. A full client in this state will additionally switch to IBSS mode. Once scanning is completed, the state transition T1522 will be taken which will bring the client to the REPORTING state S1530. In this state, the client will send report message to the server to inform the observed wireless transmission parameters scanned during the SCANNING state. If the report is successful, the client will take the state transition T1532 back to the REGISTERED state S1510. If the report is unsuccessful, the client will take the state transition T1534 to the UNREGISTERED state S1500. The state transition T1534 may be taken only after a specified number of unsuccessful reporting attempts.

FIG. 15B illustrates the flowchart when the server receives a message from a full/simple client node in step 1540. First, the type of message is checked in step 1550. If the received message is a register message, the server will perform step 1560 to update the node database with information included in the register message. This also includes incrementing the sequence number associated with the node database. Then, step 1590 is performed where an info message that contains information on the nodes currently in the system and operating parameters (such as the interval for wireless transmission parameter collection) is sent to the sender. On the other hand, if the received message is a report message that contains the observed values of wireless transmission parameters (e.g. RSSI), step 1570 will be taken where the server updates the statistics using the reported observed values. The received message will also contain the sequence number known to the sender. The server will then check this sequence number against the current sequence number associated with the nodes database in step 1580. If the two sequence numbers are not equal, the server will perform step 1590 to update the sender with latest information.

The applicability of the present invention can be quite diverse. One type of application is for location-based services provided to customers by a facility owner. For example, a shopping mail may wish to provide mall navigation services to its patrons, giving them directions how to reach a particular store from the current location of the patrons on the patrons' wireless devices (such as smart-phones, Personal Digital Assistants, etc.). The mall may also want to publish special deals like electronic discount voucher of nearby shops to the patrons' wireless devices when the patrons reach some specific points in the mall. Another example is the train operator providing location-based services to passengers. This may involve navigation within train stations (such as how to get from one platform to another), and provide destination station information to passengers in the train, such as where the nearest elevator is located based on the passenger's position on the train. It can also be used for train operators to focus their attention to passengers who need special assistance, such as those who are handicapped. The position estimation system can inform the station employees about the exact locations of such passengers and the exact disembarkation points of such passengers based on their current position in an approaching train. This way, the station employees can prepare beforehand to help the passenger with special needs. It can also be used as an application to help the meeting of people. A lot of people choose to meet up with someone else at a train station for convenience. However, because the amount of human traffic flow is large, especially in a major train station, it might be possible for two people to wait for each other at different points. The train station operator may provide a service for passenger to register for a rendezvous service, providing the position of individual person to those who registered for the rendezvous service. For this type of application, the facility owner needs to provide some incentive for the customers to install an application onto their wireless devices. This application will perform the wireless communications node functionality as described in the present invention to report observed parameters of wireless transmissions to the position estimation server (in the centralized process model), or perform their own position estimation (in the decentralized process model). Such incentive may include the benefit of using wireless access points installed in the facility to access contents (for example, patrons using hotspots provided in the shopping mall to access Internet, or passengers using wireless access points installed on trains to access train operator provided contents), or the ability to navigate within the facility, or have special services for an in-door area or location provided to the customers (for example, the case of handicapped passengers).

Sometimes, such incentive is not necessary if the entire system, including the wireless communications nodes, is under the same authority. For instance, the position estimation system can be used by the military or law enforcement agencies to present the actual location of its forces to the commanders in the command post. The present invention is particularly useful in the urban built-up environment where reliability of GPS can be sporadic. In such cases, each soldier or law enforcement officer can be equipped with wireless communications devices that perform the functions described in the present invention. Another example is in the case of estimating the positions of students within a school compound. The school administration can mandate the installation of the position estimation application onto the student's wireless devices. Yet another example is the hospital issuing wireless-enabled tags (such as wristbands) to patients. This can not only monitor the patient's vital statistics (such as heart beat rate, etc.), but also allows the doctors and nurses to locate the patients. The train station may also fall under this category, if there is no need for the passenger to carry any device that communicates with the positioning system. For example, the train stations may have security camera installed that will monitor if there are any sudden events (such as passenger standing too close to the edge of a platform). Such security camera may have wireless transmission capability to stream video directly to devices carried by train station staff. In this case, the positioning system described can be used to estimate the positions of the train station staffs. When a sudden event occurs, the system can alert those staffs that are nearest to the event. The system may alert as well to the passenger's device whose location is detected on the angle of the security camera monitoring. In this way, the train station staff can avoid any accident in advance and also the passenger can be notified and take a step back for the safety in advance to any accident.

Another possible application is in the case audio-visual devices. The present invention may be implemented on remote controls, TVs, and other home appliances so that the relative positions of these home appliances can be known. In the case of a universal remote controller (which may be a dedicated device, or an application that is installed on smart phones), the controller can display the appliances under its control on a 2-dimensional screen in a way that is consistent with the actual physical layout of the appliances, giving the user a more natural interface. Another use is like the case of wireless surround speaker system, wherein the appropriate audio channels (such as left-front or rear-right) are streamed to different speakers based on their estimated positions rather than being hardcoded. This gives the flexibility to the user who can now place speakers without having to pay attention to the labels on the speakers. Yet another possibility is that a large screen being shared by multiple users can display the contents appropriate to each user according to the relative location of the user with respect to the screen. In this application, each user will hold a wireless device (such as a smart phone or a dedicated controller) to interact with the screen. The system will estimate the relative position of each user's wireless device, and present contents requested by that user on the screen at a position according to the location of the user's wireless device. This can be useful in digital signage applications.

Yet another application may be in wireless sensors. Sensors (such as those for measuring temperature, humidity, air pressure, or vibrations) are getting cheaper, and communicate with each other wirelessly. Their relative positions can be estimated as described in this specification. This can be used to easily build a map of the sensors without having the operator to painstakingly record down the position of each sensor during deployment. A related application is wireless tags (such as Radio Frequency Identifiers, or RFID) that are embedded into objects. The system described above allows software to monitor the positions of the tags (thereby the position of the objects). This has tremendous applications in the area of logistics, warehouse storage, and even normal households (owners can use the system to locate where a misplaced object is, such as the remote control for an appliance).

Figure 16:
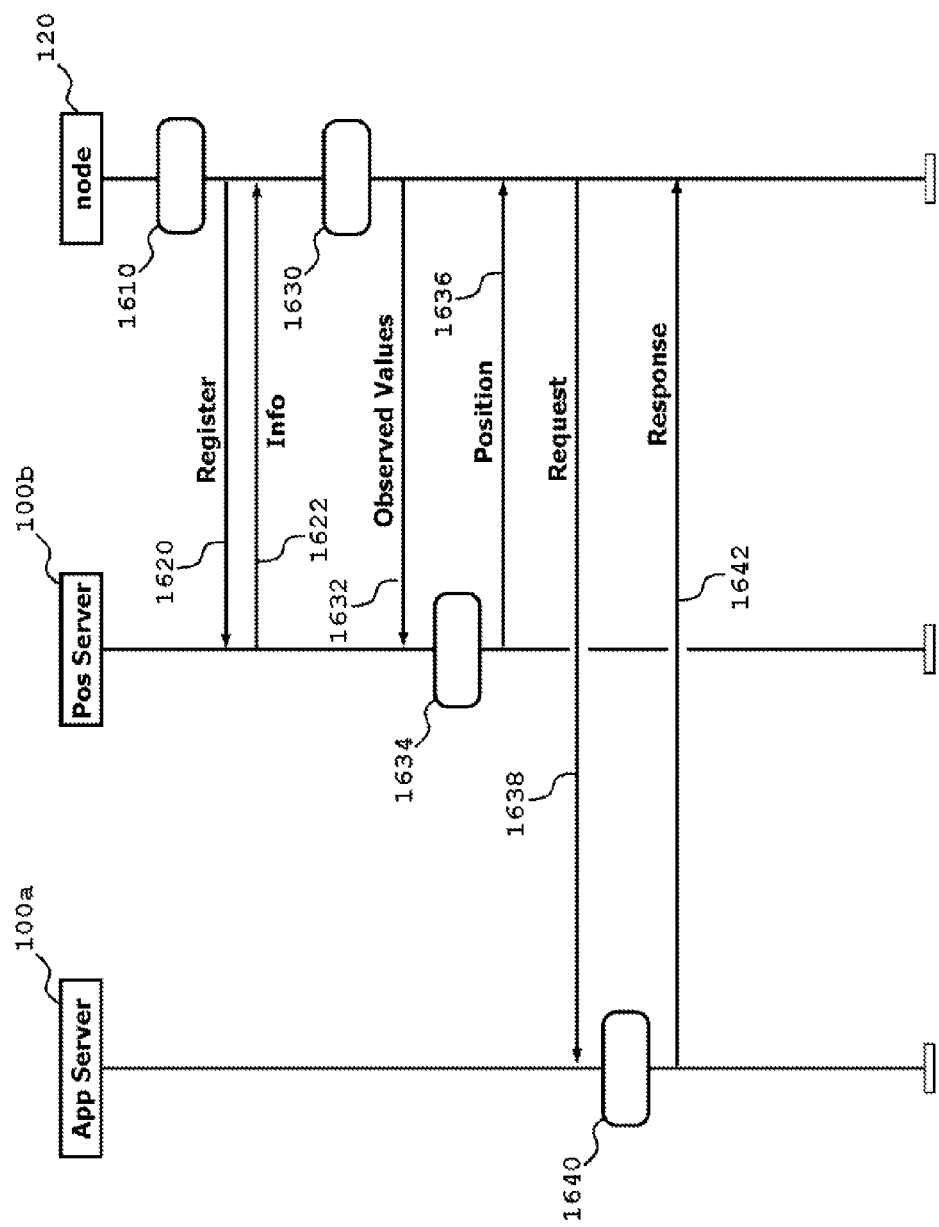
FIG. 16 depicts an exemplified message sequence diagram of the message exchange between the node, position server, and application server according to a preferred embodiment of the present invention.

In order to realize the above described application, it is necessary to integrate the position estimation system into the application system. FIG. 16 and FIG. 17 illustrate two such possible integrations. Here, we assume that there is an application server 100a that is serving the client node 120 for certain application (such as navigation). The position of the client node 120 is estimated by the position server 100b.

In the first form of integration as shown in FIG. 16, the client node 120 will register with the position server 100b only when a user has activated the service (e.g. start navigation software) as indicated by process 1610. This will trigger client node 120 to send a register message 1620 to the position server 100b. After the position server 100b has updated the node database and responded with an info message 1622, the client node 120 will perform wireless transmission parameters collection as indicated by process 1630. Upon collected the wireless transmission parameters, the client node 120 then sends the observed values in a message 1632 to the position server if 100b. Position Server 100b would then perform position estimation based on the collected statistics as indicated by process 1634, and inform the client node 120 of its estimated position in the message 1636. With its position known, the client node 120 can proceed to request services from the application server 100a with the request message 1638. This request message 1638 would contain its estimated position. The application server 100a then processes the request as indicated by the process 1640, and returns the result in response message 1642.

This first form of integration illustrates a loose integration between the application system and the position estimation system where there is little or no communications between two systems. The only interaction is through the client node. In contrast, the second form of integration as illustrated in FIG. 17, the application server and position server will have a communication interface. Initially, the application in client node 120 is activated (as indicated by process 1710), and the client node 120 registers with the position server 100b by sending a register message 1720. After the position server 100b has updated the node database and responded with an info message 1722, the client node 120 will perform periodic wireless transmission parameters collection as indicated by process 1730, and report the observed parameters to the position server 100b with the report message 1732. When some event as indicated by process 1740 occurs in the application running on the client node 120 (such as a timeout, or some user action is performed), the client node 120 will request application service from the application server 100a. This is indicated by the request message 1742. In order to service this request, the application server 100a will need the position estimate of client node 120. Hence, a position request message 1744 is sent from the application server 100a to the position server 100b. The position server 100b, possibly after performing some position estimation, responds with the position of client node 120 in the response message 1746. This allows the application server 100a to complete the service request, as indicated by process 1750, and reply the client node 120 with response message 1752.

In FIG. 17, it is illustrated that the client node will continuously run the application that will perform periodic wireless transmission parameters collection, while in FIG. 16, it is illustrated that the client node performs the same process only once when triggered by user request. It should be appreciated that both behaviors are equally applicable in either form of integration. The messages used by the client node, position server, and application server may be encapsulated in a normal UDP packet, TCP packet or using HTTP as the session transport mechanism.

The client node may be implemented on a mobile device such as a mobile phone, personal digital assistant, portable media player, or portable gaming device. When implemented on a mobile phone, it will be useful to have AT commands that allow the upper layers of the cellular stack to control or query for position estimations.

Although the present invention has been herein shown and described in what is conceived to be the most practical and preferred embodiment, it will be appreciated by those skilled in the art that various modifications may be made in details of design and parameters without departing from the scope and ambit of the present invention. For example, the present invention has been largely described as being used for position estimation of IEEE802.11 wireless clients. A person skilled in the art would recognize that the same invention can be applied to any wireless communication technology, including, but not limited to, ZigBee/IEEE802.15.4, Bluetooth, Wireless Universal Serial Bus. Radio Frequency and Ultra Wide Band. The present invention has also concentrated on using RSSI as the wireless transmission parameter for position estimation, largely due to it being universally supported by common wireless chipsets. A person skilled in the art would appreciate that if other parameters, such as time of arrival, angle of arrival, etc. are also supported in the scope of the application, then the present invention can also be applied to use these parameters without departing from the scope and ambit of the present invention.

Further, each functional block used in the description of the embodiments of the present invention as given above can be realized as LSI (Large Scale Integration), typically represented by the integrated circuit. These may be produced as one chip individually or may be designed as one chip to include a part or all. Here, it is referred as LSI, while it may be called IC, system LSI, super LSI, or ultra LSI, depending on the degree of integration.

Also, the technique of integrated circuit is not limited only to LSI and it may be realized as a dedicated circuit or a general-purpose processor. FPGA (Field Programmable Gate Array), which can be programmed after the manufacture of LSI, or a reconfigurable processor, in which connection or setting of circuit cell inside LSI can be reconfigured, may be used.

Further, with the progress of semiconductor technique or other techniques derived from it, when the technique of circuit integration to replace LSI may emerge, the functional blocks may be integrated by using such technique. For example, the adaptation of biotechnology is one of such possibilities.

INDUSTRIAL APPLICABILITY

The present invention having advantage of the fact that mobile nodes are closer to the target mobile node than the access points in most typical deployments, can be applied to the field of wireless communications. More specifically, the present invention can be applied to the technology related to the determination of the position of a single or plurality of wireless communication devices using the signals transmitted and received during wireless communications.

The invention claimed is:

1. A position estimation method to estimate positions of wireless communications nodes using parameters of wireless transmissions, said method comprising:
   a signal strength collection step where signal strength parameters of wireless transmissions are collected from wireless communications nodes;
   a virtual anchor selection step where for a target node whose position is to be estimated, one or more wireless communications nodes are selected to be virtual anchors based on some criteria;
   a position estimation step where position of the target node is estimated using the signal strength parameters of wireless transmissions associated with the selected virtual anchors and the target node; and
   a position refinement iteration step where the virtual anchor selection step and the position estimation step are re-iterated until there is no significant change in estimated positions, and
   wherein the virtual anchor selection step selects a first communications node as a virtual anchor for the position estimation of a second communications node, such that said first communications node is a target node in a previous position refinement iteration.

2. The position estimation method according to claim 1, wherein the selection of the first communications node as the virtual anchor for the position estimation of the second communications node is based on proximity between the first and the second communications nodes.

3. The position estimation method according to claim 2, wherein the proximity between the first and the second communications nodes is deduced based on a received signal strength indicator between the first and the second communications nodes.

4. The position estimation method according to claim 1, wherein the selection of the first communications node as the virtual anchor for the position estimation of a second communications node is based on past estimates of positions of the first communications node.

5. The position estimation method according to claim 1, further comprising a step of choosing among a plurality of criteria to use for virtual anchor selection, wherein each of the plurality of criteria measures a suitability of the first communications node as the virtual anchor for the position estimation of the second communications node.

6. The position estimation method according to claim 5, wherein the selection of the first communications node as a virtual anchor for the position estimation of the second communications node is based on a weighted average of different criteria that measures the suitability of said first communications node as a virtual anchor.

7. The position estimation method according to claim 6, wherein a set of weights used for the weighted average is dynamically determined based on a current environment of the wireless communications nodes.

8. The position estimation method according to claim 1, further comprising a step of assigning a weight to each virtual anchor selected from the virtual anchor selection step such that said weights are used in the position estimation step in such a way that each of at least one factor contributing to the position estimation that is associated with a virtual anchor is multiplied by the weight assigned to said virtual anchor.

9. The position estimation method according to claim 8, further comprising a step of modifying the weights assigned to each virtual anchor during each position refinement iteration.

10. The position estimation method according to claim 1, further comprising a step of determining a set of communications nodes that are potential virtual anchors for the position estimation of the target node such that in the signal strength collection step, only signal strength parameters of wireless transmissions involving the set of communications nodes are collected.

11. The position estimation method according to claim 1, wherein the position estimation step further comprises steps of:
obtaining a plurality of intermediate position estimates using parameters of wireless transmissions associated with the selected virtual anchors and the target node;
assigning a score to each of the plurality of intermediate position estimates based on some predetermined criteria;
selecting a number of intermediate position estimates from the plurality of intermediate position estimates such that the selected intermediate position estimates are those with the lowest scores; and
estimating the position of the target node by averaging the selected intermediate position estimates; and
wherein the number of selected intermediate position estimates is determined based on the signal strength parameters of wireless transmissions.

12. The position estimation method according to claim 1, further comprising an operating parameters determination step where transmission power of a communications node or interval between successive collection of signal strength parameters of wireless transmissions at a communications node is determined based on the collected signal strength parameters of wireless transmissions.

13. A position estimation system for estimating a position of wireless communications node using parameters of wireless transmissions, said system comprising:
a plurality of wireless communications nodes; and
a position estimating node with an arrangement such that the position estimating node estimates the position of one or more wireless communications nodes,
wherein the position estimating node comprises:
a parameter collection unit to collect signal strength parameters of wireless transmission from the wireless communications nodes;
a virtual anchors selection unit to select one or more wireless communications nodes to be virtual anchors for a position estimation of a target communications node based on some criteria; and
a position estimation unit to estimate the position of the target communications node using the parameters of wireless transmissions associated with the selected virtual anchors and the target communications node; and wherein the position estimating node iteratively selects virtual anchors and estimates the position of the target communications nodes until there is no significant change in estimated positions, and
wherein the virtual anchor selection unit selects a first communications node as a virtual anchor for the position estimation of a second communications node, such that said first communications node is a target node in a previous position refinement iteration.

14. The position estimation system according to claim 13, wherein the position estimation system operates in any one of the following modes:
a pure-ad-hoc mode where all the wireless communications nodes operate in independent basic service set mode of communications if all the wireless communications nodes is capable of independent basic service set mode operation;
an infrastructure-only mode where all the wireless communications nodes operate in extended service set mode of communications if all the wireless communications nodes are not capable of independent basic service set mode operation; or
a hybrid node where all the wireless communications nodes operate in extended service set mode of communications if not all the wireless communications nodes are capable of independent basic service set mode operation, with the arrangement such that those wireless communications node that are capable of independent basic service set mode operation will periodically switch from extended service set mode of operation to independent basic service set mode of operation using distinct service set identifiers so that the wireless communications nodes that are not capable of independent basic service set mode operation can receive beacons message transmitted by those nodes operating in independent basic service set mode.

15. A position estimating apparatus for estimating positions of wireless communications nodes using signal strength parameters of the wireless transmissions, said apparatus comprising:
a signal strength collection unit to collect the signal strength parameters of wireless transmissions from wireless communications nodes;
a virtual anchor selection unit to select one or more wireless communications nodes to be virtual anchors based on some criteria for each target node whose position is to be estimated;
a position estimation unit to estimate position of the target node using the signal strength parameters of wireless transmissions associated with the selected virtual anchors and the target node; and
a position refinement iteration unit which reiterates the virtual anchor selection and the position estimation until there is no significant change in estimated positions, and
wherein the virtual anchor selection unit selects a first communications node as a virtual anchor for the position estimation of a second communications node, such that said first communications node is a target node in a previous position refinement iteration.

* * * * *